(12) United States Patent
Locke et al.

(10) Patent No.: US 12,496,230 B2
(45) Date of Patent: Dec. 16, 2025

(54) MOISTURE AND ELECTROMAGNETIC RADIATION SWITCHABLE ADHESIVE AND APPARATUSES, SYSTEMS, AND METHODS THEREFORE

(71) Applicant: Solventum Intellectual Properties Company, Maplewood, MN (US)

(72) Inventors: Christopher Brian Locke, Bournemouth (GB); Timothy Mark Robinson, Shillingstone (GB)

(73) Assignee: Solventum Intellectual Properties Company, Maplewood, MN (US)

( * ) Notice: Subject to any disclaimer, the term of this patent is extended or adjusted under 35 U.S.C. 154(b) by 1005 days.

(21) Appl. No.: 17/616,970

(22) PCT Filed: Sep. 11, 2019

(86) PCT No.: PCT/US2019/050523
§ 371 (c)(1),
(2) Date: Dec. 6, 2021

(87) PCT Pub. No.: WO2020/247007
PCT Pub. Date: Dec. 10, 2020

(65) Prior Publication Data
US 2022/0233360 A1 Jul. 28, 2022

Related U.S. Application Data

(60) Provisional application No. 62/858,126, filed on Jun. 6, 2019.

(51) Int. Cl.
*A61F 13/0246* (2024.01)
*A61F 13/02* (2006.01)
*C09J 5/00* (2006.01)
*C09J 7/10* (2018.01)
*C09J 7/32* (2018.01)

(52) U.S. Cl.
CPC ...... *A61F 13/0253* (2013.01); *A61F 13/0263* (2013.01); *C09J 5/00* (2013.01); *C09J 7/10* (2018.01); *C09J 7/32* (2018.01); *C09J 2301/306* (2020.08); *C09J 2301/416* (2020.08); *C09J 2301/502* (2020.08); *C09J 2433/00* (2013.01); *C09J 2471/00* (2013.01); *C09J 2475/00* (2013.01); *C09J 2483/00* (2013.01)

(58) Field of Classification Search
None
See application file for complete search history.

(56) References Cited

U.S. PATENT DOCUMENTS

| | | |
|---|---|---|
| 1,355,846 A | 10/1920 | Rannells |
| 2,547,758 A | 4/1951 | Keeling |
| 2,632,443 A | 3/1953 | Lesher |
| 2,682,873 A | 7/1954 | Evans et al. |
| 2,910,763 A | 11/1959 | Lauterbach |
| 2,969,057 A | 1/1961 | Simmons |
| 3,066,672 A | 12/1962 | Crosby, Jr. et al. |
| 3,367,332 A | 2/1968 | Groves |
| 3,520,300 A | 7/1970 | Flower, Jr. |
| 3,568,675 A | 3/1971 | Harvey |
| 3,648,692 A | 3/1972 | Wheeler |
| 3,682,180 A | 8/1972 | McFarlane |
| 3,826,254 A | 7/1974 | Mellor |
| 4,080,970 A | 3/1978 | Miller |
| 4,096,853 A | 6/1978 | Weigand |
| 4,139,004 A | 2/1979 | Gonzalez, Jr. |
| 4,165,748 A | 8/1979 | Johnson |
| 4,184,510 A | 1/1980 | Murry et al. |
| 4,233,969 A | 11/1980 | Lock et al. |
| 4,245,630 A | 1/1981 | Lloyd et al. |
| 4,256,109 A | 3/1981 | Nichols |
| 4,261,363 A | 4/1981 | Russo |
| 4,275,721 A | 6/1981 | Olson |
| 4,284,079 A | 8/1981 | Adair |
| 4,297,995 A | 11/1981 | Golub |
| 4,333,468 A | 6/1982 | Geist |
| 4,373,519 A | 2/1983 | Errede et al. |
| 4,382,441 A | 5/1983 | Svedman |
| 4,392,853 A | 7/1983 | Muto |
| 4,392,858 A | 7/1983 | George et al. |
| 4,419,097 A | 12/1983 | Rowland |
| 4,465,485 A | 8/1984 | Kashmer et al. |
| 4,475,909 A | 10/1984 | Eisenberg |
| 4,480,638 A | 11/1984 | Schmid |
| 4,525,166 A | 6/1985 | Leclerc |
| 4,525,374 A | 6/1985 | Vaillancourt |

(Continued)

FOREIGN PATENT DOCUMENTS

| | | |
|---|---|---|
| AU | 550575 B2 | 3/1986 |
| AU | 745271 B2 | 3/2002 |

(Continued)

OTHER PUBLICATIONS

European Examination Report for corresponding application 19773316.5, dated Oct. 23, 2023.
International Search Report and Written Opinion for Corresponding Application No. PCT/US2019/050523 mailed Feb. 19, 2020.
Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.
Susan Mendez-Eatmen, RN; "When wounds Won't Heal" RN Jan. 1998, vol. 61 (1); Medical Economics Company, Inc., Montvale, NJ, USA; pp. 20-24.
James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.

(Continued)

*Primary Examiner* — Nannette Holloman

(57) ABSTRACT

This disclosure describes devices, systems, and methods related to dual switchable adhesives, the manufacture thereof, and the use thereof. An exemplary dual switchable adhesive includes one or more polymers, photo initiators configured to cause the one or more polymers to cross-link responsive to receiving light, and polymerization initiators configured to cause the one or more polymers to cross-link responsive to receiving moisture.

8 Claims, 14 Drawing Sheets

(56) References Cited

U.S. PATENT DOCUMENTS

| | | |
|---|---|---|
| 4,540,412 A | 9/1985 | Van Overloop |
| 4,543,100 A | 9/1985 | Brodsky |
| 4,548,202 A | 10/1985 | Duncan |
| 4,551,139 A | 11/1985 | Plaas et al. |
| 4,569,348 A | 2/1986 | Hasslinger |
| 4,605,399 A | 8/1986 | Weston et al. |
| 4,608,041 A | 8/1986 | Nielsen |
| 4,640,688 A | 2/1987 | Hauser |
| 4,655,754 A | 4/1987 | Richmond et al. |
| 4,664,662 A | 5/1987 | Webster |
| 4,710,165 A | 12/1987 | McNeil et al. |
| 4,733,659 A | 3/1988 | Edenbaum et al. |
| 4,743,232 A | 5/1988 | Kruger |
| 4,758,220 A | 7/1988 | Sundblom et al. |
| 4,787,888 A | 11/1988 | Fox |
| 4,826,494 A | 5/1989 | Richmond et al. |
| 4,838,883 A | 6/1989 | Matsuura |
| 4,840,187 A | 6/1989 | Brazier |
| 4,863,449 A | 9/1989 | Therriault et al. |
| 4,872,450 A | 10/1989 | Austad |
| 4,878,901 A | 11/1989 | Sachse |
| 4,897,081 A | 1/1990 | Poirier et al. |
| 4,906,233 A | 3/1990 | Moriuchi et al. |
| 4,906,240 A | 3/1990 | Reed et al. |
| 4,919,654 A | 4/1990 | Kalt |
| 4,941,882 A | 7/1990 | Ward et al. |
| 4,953,565 A | 9/1990 | Tachibana et al. |
| 4,969,880 A | 11/1990 | Zamierowski |
| 4,985,019 A | 1/1991 | Michelson |
| 5,037,397 A | 8/1991 | Kalt et al. |
| 5,086,170 A | 2/1992 | Luheshi et al. |
| 5,092,858 A | 3/1992 | Benson et al. |
| 5,100,396 A | 3/1992 | Zamierowski |
| 5,134,994 A | 8/1992 | Say |
| 5,149,331 A | 9/1992 | Ferdman et al. |
| 5,167,613 A | 12/1992 | Karami et al. |
| 5,176,663 A | 1/1993 | Svedman et al. |
| 5,215,522 A | 6/1993 | Page et al. |
| 5,232,453 A | 8/1993 | Plass et al. |
| 5,261,893 A | 11/1993 | Zamierowski |
| 5,278,100 A | 1/1994 | Doan et al. |
| 5,279,550 A | 1/1994 | Habib et al. |
| 5,298,015 A | 3/1994 | Komatsuzaki et al. |
| 5,342,376 A | 8/1994 | Ruff |
| 5,344,415 A | 9/1994 | DeBusk et al. |
| 5,358,494 A | 10/1994 | Svedman |
| 5,437,622 A | 8/1995 | Carion |
| 5,437,651 A | 8/1995 | Todd et al. |
| 5,527,293 A | 6/1996 | Zamierowski |
| 5,549,584 A | 8/1996 | Gross |
| 5,556,375 A | 9/1996 | Ewall |
| 5,607,388 A | 3/1997 | Ewall |
| 5,636,643 A | 6/1997 | Argenta et al. |
| 5,645,081 A | 7/1997 | Argenta et al. |
| 6,071,267 A | 6/2000 | Zamierowski |
| 6,135,116 A | 10/2000 | Vogel et al. |
| 6,241,747 B1 | 6/2001 | Ruff |
| 6,287,316 B1 | 9/2001 | Agarwal et al. |
| 6,345,623 B1 | 2/2002 | Heaton et al. |
| 6,488,643 B1 | 12/2002 | Tumey et al. |
| 6,493,568 B1 | 12/2002 | Bell et al. |
| 6,553,998 B2 | 4/2003 | Heaton et al. |
| 6,814,079 B2 | 11/2004 | Heaton et al. |
| 7,105,584 B2 | 9/2006 | Chambers et al. |
| 7,846,141 B2 | 12/2010 | Weston |
| 8,062,273 B2 | 11/2011 | Weston |
| 8,216,198 B2 | 7/2012 | Heagle et al. |
| 8,251,979 B2 | 8/2012 | Malhi |
| 8,257,327 B2 | 9/2012 | Blott et al. |
| 8,398,614 B2 | 3/2013 | Blott et al. |
| 8,449,509 B2 | 5/2013 | Weston |
| 8,529,548 B2 | 9/2013 | Blott et al. |
| 8,535,296 B2 | 9/2013 | Blott et al. |
| 8,551,060 B2 | 10/2013 | Schuessler et al. |
| 8,568,386 B2 | 10/2013 | Malhi |
| 8,679,081 B2 | 3/2014 | Heagle et al. |
| 8,834,451 B2 | 9/2014 | Blott et al. |
| 8,926,592 B2 | 1/2015 | Blott et al. |
| 9,017,302 B2 | 4/2015 | Vitaris et al. |
| 9,198,801 B2 | 12/2015 | Weston |
| 9,211,365 B2 | 12/2015 | Weston |
| 9,289,542 B2 | 3/2016 | Blott et al. |
| 2002/0077661 A1 | 6/2002 | Saadat |
| 2002/0115951 A1 | 8/2002 | Norstrem et al. |
| 2002/0120185 A1 | 8/2002 | Johnson |
| 2002/0143286 A1 | 10/2002 | Tumey |
| 2014/0163491 A1 | 6/2014 | Schuessler et al. |
| 2015/0080788 A1 | 3/2015 | Blott et al. |
| 2017/0239384 A1 | 8/2017 | Lam et al. |
| 2018/0133360 A1 | 5/2018 | Bingol et al. |
| 2019/0117824 A1 | 4/2019 | Hansen et al. |

FOREIGN PATENT DOCUMENTS

| | | |
|---|---|---|
| AU | 755496 B2 | 12/2002 |
| CA | 2005436 A1 | 6/1990 |
| CN | 105754544 A | 7/2016 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |
| GB | 692578 A | 6/1953 |
| GB | 2195255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |
| JP | 4129536 B2 | 8/2008 |
| SG | 71559 | 4/2002 |
| WO | 80/02182 A1 | 10/1980 |
| WO | 87/04626 A1 | 8/1987 |
| WO | 90/010424 A1 | 9/1990 |
| WO | 93/009727 A1 | 5/1993 |
| WO | 94/20041 A1 | 9/1994 |
| WO | 96/05873 A1 | 2/1996 |
| WO | 97/18007 A1 | 5/1997 |
| WO | 99/13793 A1 | 3/1999 |
| WO | 2014202935 A1 | 12/2014 |
| WO | 2016141546 A1 | 9/2016 |
| WO | 2017201229 A1 | 11/2017 |
| WO | 2018226707 A1 | 12/2018 |

OTHER PUBLICATIONS

John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.

S.E. Greer, et al. "The Use of Subatmospheric Pressure Dressing Therapy to Close Lymphocutaneous Fistulas of the Groin" British Journal of Plastic Surgery (2000), 53, pp. 484-487.

George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; Nov. 23, 1995.

PCT International Search Report for PCT International Application PCT/GB98/02713; Jan. 8, 1999.

PCT Written Opinion; PCT International Application PCT/GB98/02713; Jun. 8, 1999.

PCT International Examination and Search Report, PCT International Application PCT/GB96/02802; Jan. 15, 1998 & Apr. 29, 1997.

(56) References Cited

OTHER PUBLICATIONS

PCT Written Opinion, PCT International Application PCT/GB96/02802; Sep. 3, 1997.
Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.
Kostyuchenok, B.M., et al; "Vacuum Treatment in the Surgical Management of Purulent Wounds"; Vestnik Khirurgi Sep. 1986, pp. 18-21 and 6 page English translation thereof.
Davydov, Yu. A., et al; "Vacuum Therapy in the Treatment of Purulent Lactation Mastitis"; Vestnik Khirurgi, May 14, 1986, pp. 66-70, and 9 page English translation thereof.
Yusupov. Yu.N., et al; "Active Wound Drainage", Vestnki Khirurgi, vol. 138, Issue 4, 1987, and 7 page English translation thereof.
Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.
Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.
Chariker, Mark E., M.D., et al; "Effective Management of incisional and cutaneous fistulae with closed suction wound drainage"; Contemporary Surgery, vol. 34, Jun. 1989, pp. 59-63.
Egnell Minor, Instruction Book, First Edition, 300 7502, Feb. 1975, pp. 24.
Egnell Minor: Addition to the Users Manual Concerning Overflow Protection—Concerns all Egnell Pumps, Feb. 3, 1983, pp. 2.
Svedman, P.: "Irrigation Treatment of Leg Ulcers", The Lancet, Sep. 3, 1983, pp. 532-534.
Chinn, Steven D. et al.: "Closed Wound Suction Drainage", The Journal of Foot Surgery, vol. 24, No. 1, 1985, pp. 76-81.
Arnljots, Björn et al.: "Irrigation Treatment in Split-Thickness Skin Grafting of Intractable Leg Ulcers", Scand J. Plast Reconstr. Surg., No. 19, 1985, pp. 211-213.
Svedman, P.: "A Dressing Allowing Continuous Treatment of a Biosurface", IRCS Medical Science: Biomedical Technology, Clinical Medicine, Surgery and Transplantation, vol. 7, 1979, p. 221.
Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.
N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).
K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.
G. Živadinovi?, V. ? uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).
F.E. Johnson, "An Improved Technique for Skin Graft Placement Using a Suction Drain," Surgery, Gynecology, and Obstetrics 159 (1984), pp. 584-585.
A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).
M. Schein, R. Saadia, J.R. Jamieson, and G.A.G. Decker, "The 'Sandwich Technique' in the Management of the Open Abdomen," British Journal of Surgery 73 (1986), pp. 369-370.
D.E. Tribble, An Improved Sump Drain-Irrigation Device of Simple Construction, Archives of Surgery 105 (1972) pp. 511-513.
M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).
C.E. Tennants, "The Use of Hypermia in the Postoperative Treatment of Lesions of the Extremities and Thorax," Journal of the American Medical Association 64 (1915), pp. 1548-1549.
Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.
V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").
V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").
V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").
V.A.C.® Therapy Clinical Guidelines: A Reference Source for Clinicians; Jul. 2007.

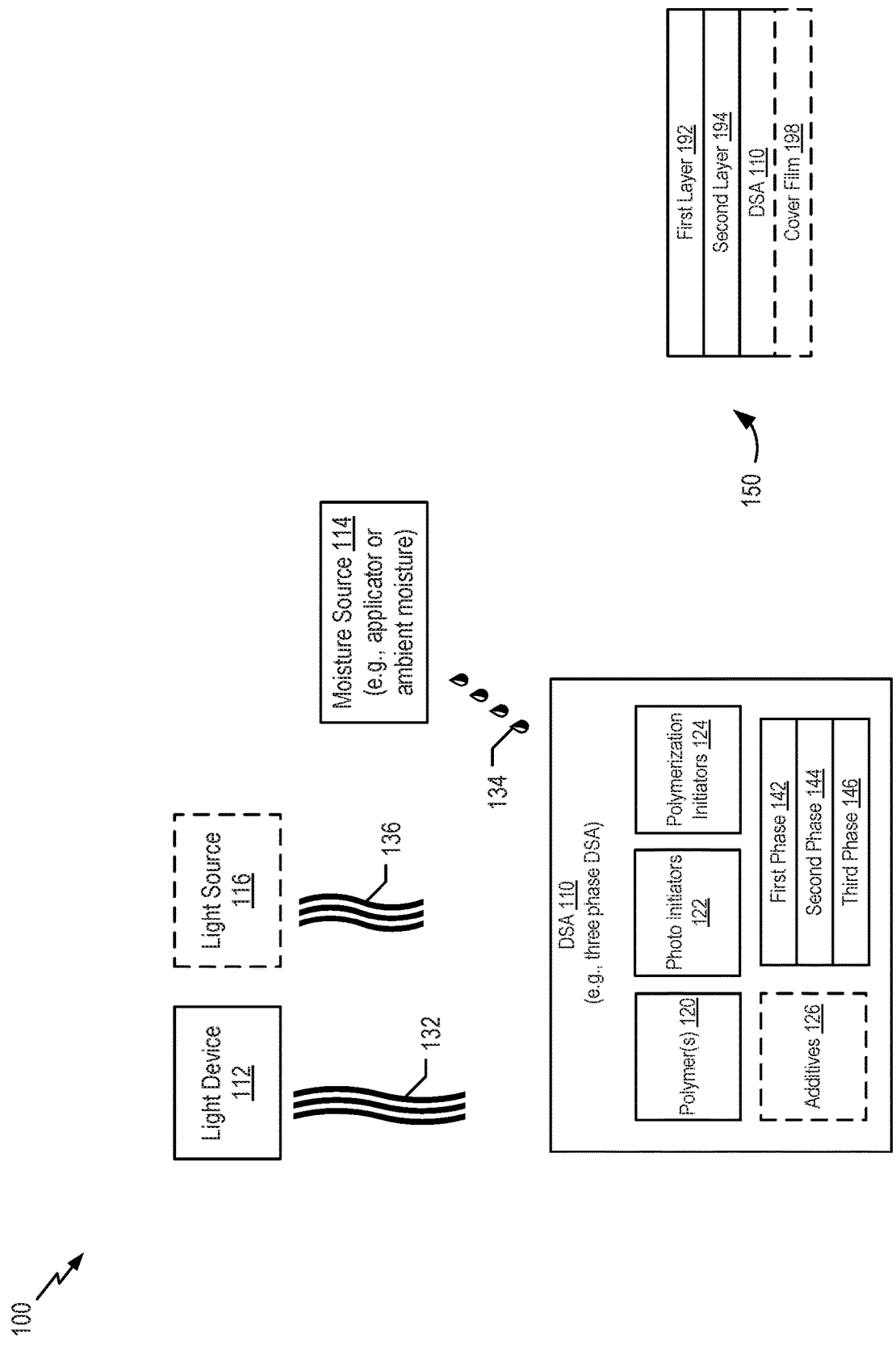

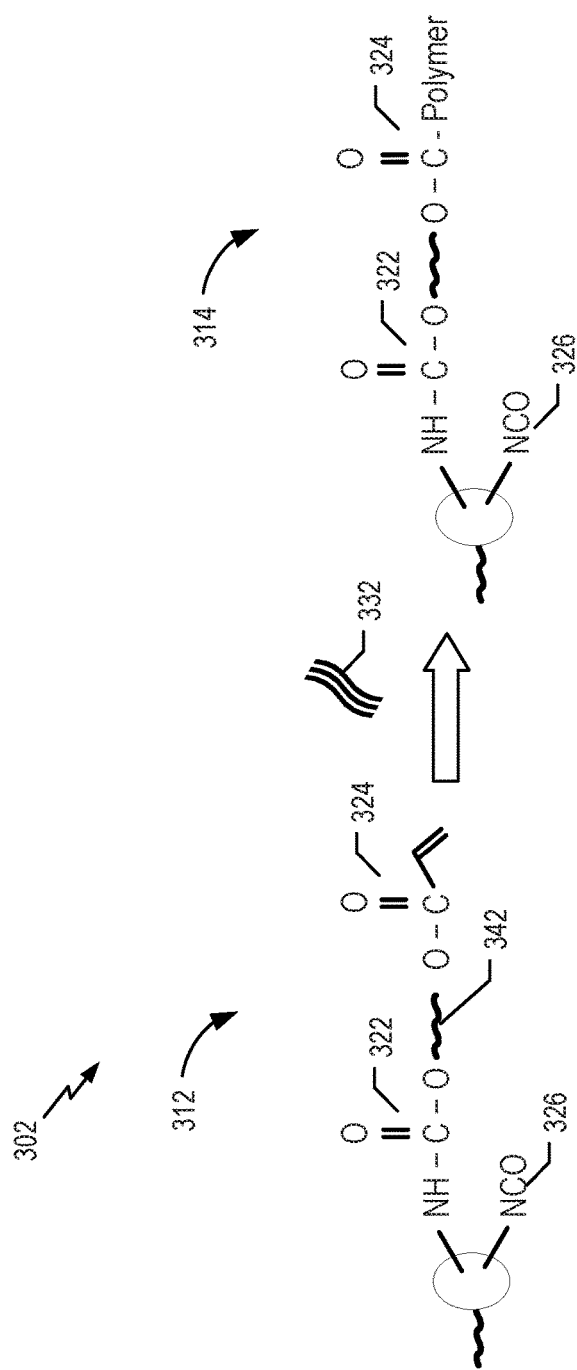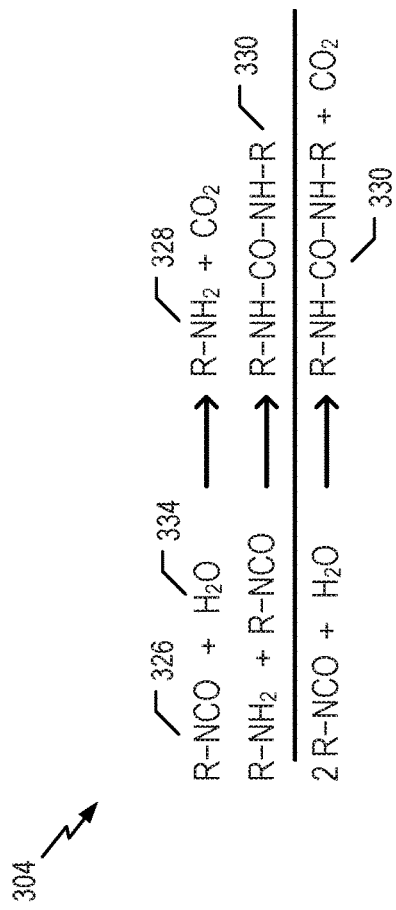
FIG. 3A
FIG. 3B

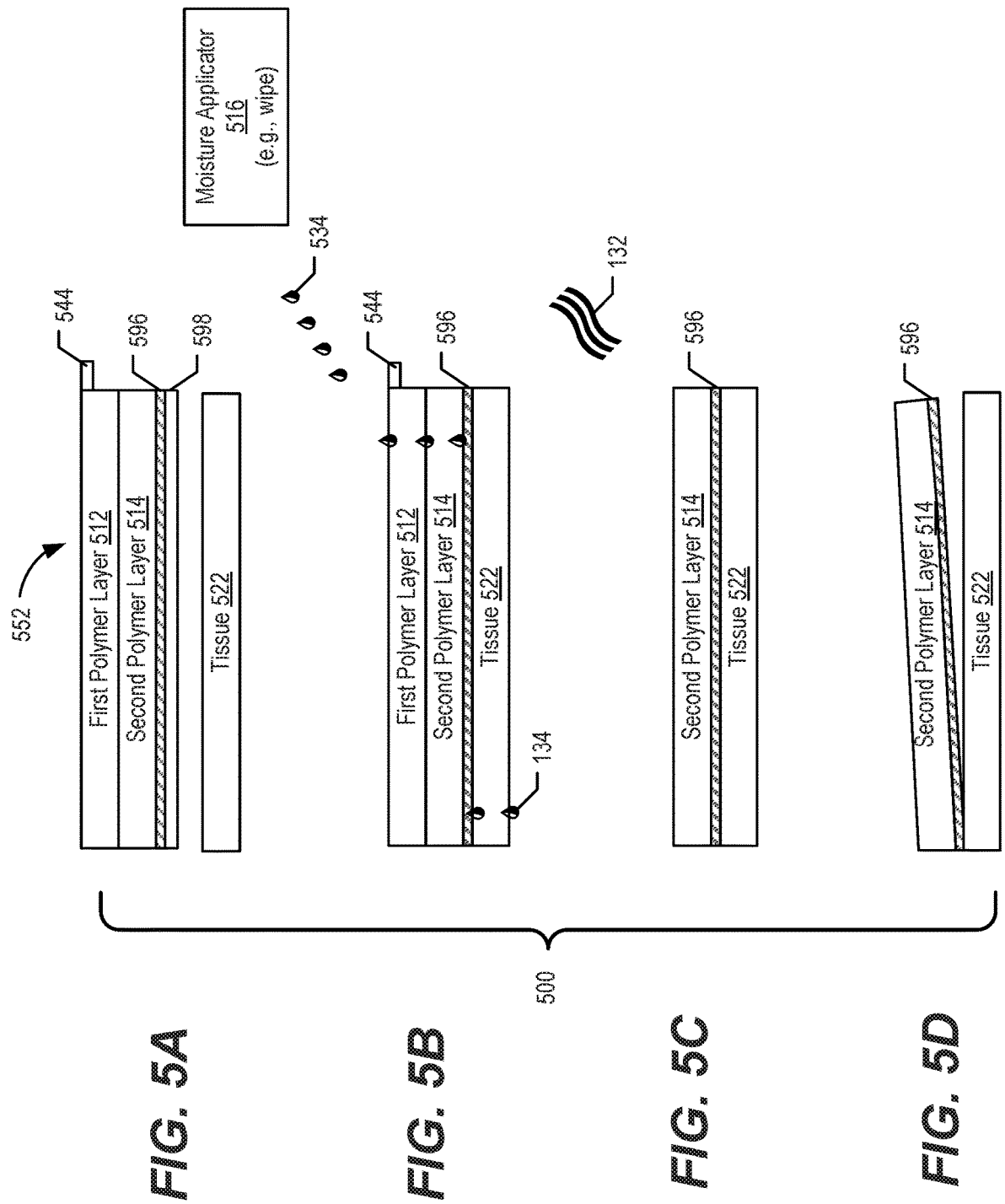

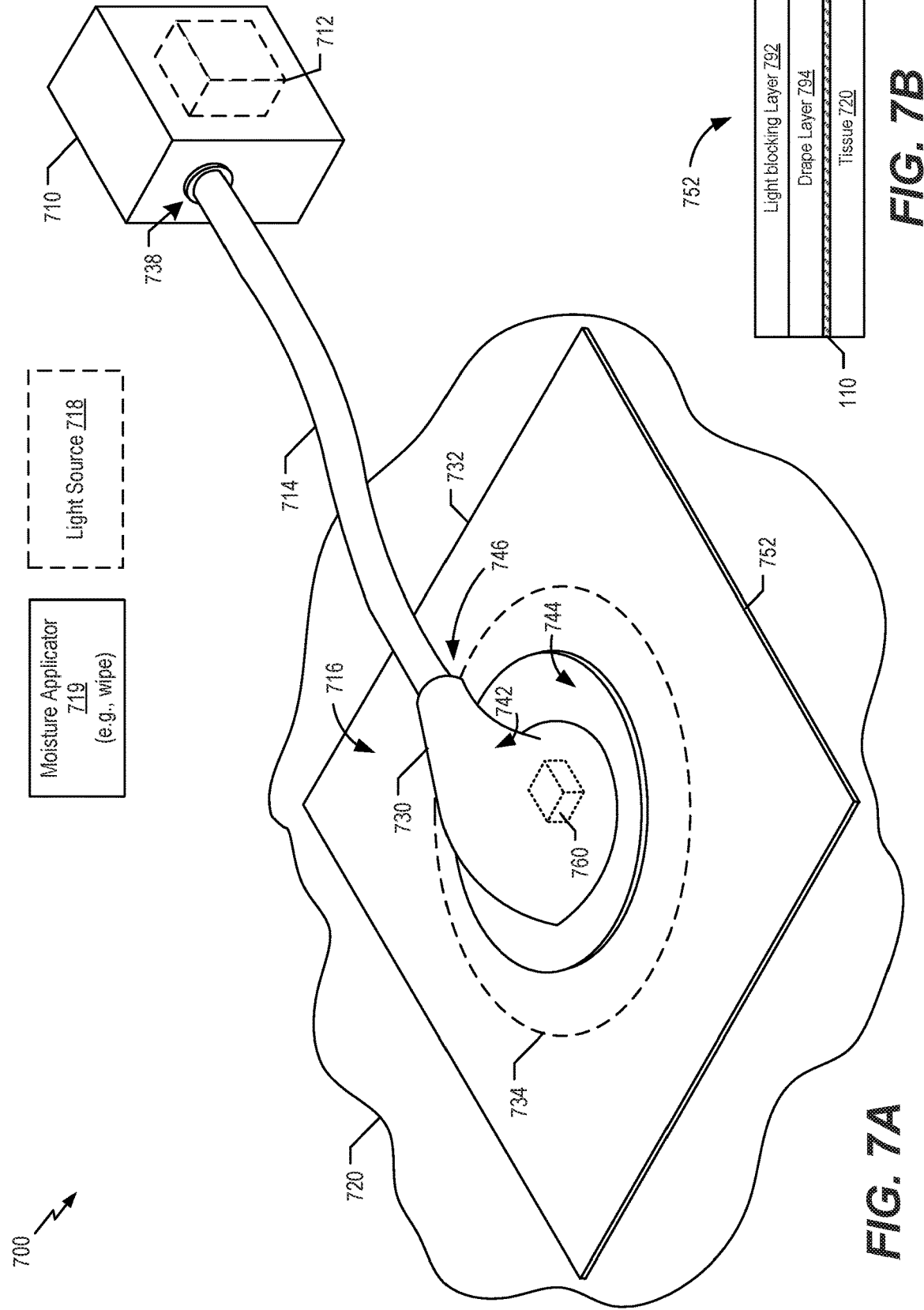

MOISTURE AND ELECTROMAGNETIC RADIATION SWITCHABLE ADHESIVE AND APPARATUSES, SYSTEMS, AND METHODS THEREFORE

CROSS-REFERENCE TO RELATED APPLICATIONS

This application claims priority to and the benefit of U.S. Provisional Application No. 62/858,126, filed Jun. 6, 2019, the contents of which is incorporated into the present application by reference.

TECHNICAL FIELD

Aspects of the present disclosure relate generally to a switchable adhesive, such as a light or moisture switchable adhesive for use with medical devices, and more specifically, but not by way of limitation, to an apparatus including the switchable adhesive and an apparatus, system, and method for forming the switchable adhesive.

BACKGROUND

Switchable (or switched) adhesives are pressure sensitive adhesives that are "switchable" from a tacky state to a non-tacky or low-tack state in which the switched adhesive has a reduced peel strength relative to the peel strength of the adhesive before switching. Conventional switchable adhesives have two states or phases (e.g., off and on). In the first state, the switchable adhesive is tacky and sticks to itself and other objects. Once the conventional switchable adhesive is switched or activated, the conventional switchable adhesive cross-links and becomes brittle and hard, which reduces the tackiness and peel strength. The cross-linking is an irreversible chemical process and thus, a conventional switchable adhesive can only be switched once, from a high tact/peel strength state to a lower tact/peel strength state. Light and moisture switchable adhesives have been incorporated into many products, including some medical devices.

When applying medical devices, such as a dressing, the dressing is often repositioned during an initial application of the dressing or the dressing comes into inadvertent contact with an unintended object during application. With conventional adhesives and switchable adhesives, the dressing and adhesive are applied to the patient in a high tact/peel strength state. Thus, a patient may have to go back to the emergency room and undergo anesthesia to have the dressing repositioned/removed or a switchable adhesive of the dressing is activated to facilitate easier removal and the dressing is wasted. Similarly, when a conventional acrylic adhesive or conventional switchable adhesive comes into contact with itself or another component (i.e., not the intended bond site) during application, the components often become inseparable and cannot be separated without damaging the components and/or the adhesive, and thus the components are wasted. As an illustrative example, drape layers can be susceptible to such problems. For example, the drape layer is often thin and has a tendency to bunch up, causing the conventional switchable adhesive to stick to itself and the drape.

While silicone adhesives may be reworked and repositioned during application, including worked into creases of the tissue or to accommodate complex shapes, and may be recoverable from unintended contact, silicone adhesives do not offer sufficient bond/peel strength and wearability time as compared to conventional acrylic adhesives or conventional switchable adhesives. Additionally, in some medical applications components (e.g., single use components) may be assembled incorrectly. In such cases, the components cannot be disassembled and reconnected because the conventional acrylic adhesive or the conventional switchable adhesive is not reusable.

Therefore, conventional switchable adhesive applications are not repositionable and are harder and less forgiving to apply as compared to silicone adhesives. As a result conventional switchable adhesives and medical devices that incorporate such conventional switchable adhesives can be painful or impossible to reposition and/or reapply.

SUMMARY

This disclosure describes switchable adhesives, devices including switchable adhesives, and systems and methods related to forming and/or using switchable adhesives. The switchable adhesives described herein include more than two phases, such as three or more phases, also referred to herein as states, and are activated by two different sources, such as moisture and light (electromagnetic radiation). For example, the switchable adhesives (e.g., dual switchable adhesives) described herein include photo initiators and polymerization initiators which transition the switchable adhesive between phases multiple times. To illustrate, the switchable adhesives described herein include (i.e., are transitionable between) a first phase with a low peel strength state and tact, a second phase with a relatively higher peel strength, and a third phase with a relatively lower peel strength. Such switchable adhesives (e.g., dual switchable adhesives) described herein may include or correspond to dual cure switchable adhesives which include two different types of curing agents or systems. Multiple types of curing initiators (e.g., polymerization initiators, photo initiators, etc.) can be used to transition the switchable adhesive between the first, second, and third phases. Accordingly, the switchable adhesives described herein can be repositioned and are resistant to inadvertent contact.

To illustrate, the first phase is a partially cured or uncured state and has a low peel strength and tact. In the first phase, the switchable adhesive can be repositioned because it has a low peel strength and tact as compared to conventional light switchable adhesives and acrylic adhesives. As an analogy, the switchable adhesives described herein behave more like silicone adhesives than conventional light switchable adhesives and acrylic adhesives when in the first phase. For, example, the switchable adhesives described herein can be worked into creases or to adapt to complex geometries to accommodate a tissue site and/or patient. However, the switchable adhesives described herein can be cured or increased in a curing amount or degree by applying a first activator (e.g., moisture, light, or both) to increase a peel strength and tact of the switchable adhesive. Thus, the switchable adhesive, once placed in or worked into a desired position, can be set or cured to a second state (an operational state) where the switchable adhesive has a peel strength and tact similar to conventional light switchable adhesives and acrylic adhesives.

Similar to conventional light switchable adhesives, the switchable adhesives described herein can be "deactivated" to achieve a lower peel strength responsive to receiving light. To illustrate, the switchable adhesives described herein receive a second activator (e.g., second moisture, light, or both) and transition from the second phase to a third phase where the switchable adhesive can be removed. Accordingly, the switchable adhesives described herein offer stronger peel strengths and longer wear times than silicone adhesives, while offering silicone adhesive like benefits of repositioning with lower tact. The switchable adhesives describe herein are easier to use than acrylic adhesives and conventional light switchable adhesives because they include an extra phase with a lower tact and peel strength to facilitate easier application and repositioning.

In some implementations, a switchable adhesive is included in a compound film. An exemplary compound film may include two layers of polymer materials, where the layers are separable or removable. A removable layer can block or filter wavelengths of light that would otherwise activate photo initiators of the switchable adhesive. The removable layer may pass or transmit light that is capable of activating photo initiators of the switchable adhesive. The compound film may be included in medical device to provide for pain and trauma free removal of wound dressing and/or single use connections between components.

Thus, the switchable adhesives of the present disclosure are configured to have an additional phase or state, as compared to conventional two phase switchable adhesives or two phase light switchable adhesives. Accordingly, such switchable adhesives can be worked into creases or contoured to a tissue site, can be repositioned, and are more resilient to inadvertent contact or improper assembly than conventional two phase switchable adhesives. Therefore, the switchable adhesives described herein are suitable for use in medical devices, such as bandages, drapes, dressings, and wound closures. The switchable adhesives enable medical devices to be repositioned and removed easily, thereby avoiding or limiting maceration and tissue damage at a tissue site and patient discomfort. Accordingly, the switchable adhesives may enable improved wound care and therapy and increased wear times of medical devices, thereby advancing patient comfort and confidence in the treatment.

Additionally, the switchable adhesives of the present disclosure are configured to include different types of curing systems and are activated by two different type of activators. Thus, the switchable adhesives of the present disclose can be activated by ambient moisture from the environment or moisture applied from an applicator. Accordingly, the switchable adhesives of the present disclosure may not utilize multiple different type of light to set and remove. In addition, moisture based curing can penetrate thicker adhesives and components, as compared to light based curing. Accordingly, moisture based curing systems can enable the use of thicker adhesives.

Some embodiments of the present compositions (e.g., a dual switchable adhesive or a dual cure switchable adhesive) comprise: one or more polymers; polymerization initiators configured to cause the one or more polymers to cross-link responsive to receiving moisture; and photo initiators configured to cause the one or more polymers to cross-link responsive to receiving light.

In some of the foregoing embodiments of the present compositions, the dual switchable adhesive has at least three phases, each phase corresponding to a particular peel strength, and wherein the dual switchable adhesive is configured to transition between a first two phases of the three phases based on activation of the polymerization initiators and to transition between a second two phases of the three phases based on activation of the photo initiators. In other embodiments, the dual switchable adhesive is configured to transition between a first two phases of the three phases based on activation of the photo initiators and to transition between a second two phases of the three phases based on activation of the polymerization initiators. In some implementations, the dual switchable adhesive has a second peel strength in the second phase that is greater than a first peel strength of the dual switchable adhesive in the first phase, and wherein a third peel strength of the dual switchable adhesive in the third phase is less than the second peel strength.

In some of the foregoing embodiments of the present compositions, the one or more polymers include an acrylate polymer, and wherein the dual switchable adhesive comprises a polymer composition that includes the one or more polymers, the first photo initiators, and the second photo initiators. In some implementations, the one or more polymers include urethane acrylate, methyl acrylate, silicone acrylate, polyether, polyurethane, or a combination thereof.

In some of the foregoing embodiments of the present compositions, the photo initiators have a peak absorbance between 750 nanometers (nm) to 860 nm. In some implementations, the photo initiators have a peak absorbance between 200 nanometers (nm) to 400 nm. In some of the foregoing embodiments of the present compositions, the photo initiators comprise H-Nu-IR 780, H-Nu-IR 815, or both. In some implementations, the photo initiators comprise Irgacure 819.

In some of the foregoing embodiments of the present compositions, the dual switchable adhesive has a peel strength of less than 7 N/25 mm on stainless steel at 180 degrees in a first phase. In some implementations, the dual switchable adhesive has a peel strength of greater 8 N/25 mm on stainless steel at 180 degrees in a second phase. Additionally, or alternatively, the dual switchable adhesive has a peel strength of less than 7 N/25 mm on stainless steel at 180 degrees in a third phase.

In some of the foregoing embodiments of the present compositions, the dual switchable adhesive has an areal weight of 100 to 250 grams per square meter (gsm). In some implementations, the dual switchable adhesive has a moisture vapor transfer rate (MVTR) of greater than 250 g/m². Additionally, or alternatively, the dual switchable adhesive has a dynamic viscosity of 320-500 millipascal-second (mPa*s) when in a first phase.

In some of the foregoing embodiments of the present compositions, the dual switchable adhesive has a second level of cross-linking in the second phase that is greater than a first level of cross-linking in the first phase, and wherein the dual switchable adhesive has a third level of cross-linking in the third phase that is greater than the second level of cross-linking.

Some embodiments of the present apparatuses (e.g., a compound film) comprise: a first layer of a first polymer composition; a second layer of a second polymer composition, the second layer removeably coupled to the first layer; and a dual switchable adhesive of the foregoing embodiments coupled to the second polymer layer. In some of the foregoing embodiments of the present apparatuses: the first layer is in direct contact with the second layer; and the dual switchable adhesive is in direct contact with the second layer. In some implementations, the first layer is opaque and the second layer is optically transparent.

In some of the foregoing embodiments of the present apparatuses: the first layer is configured to block or filter ultraviolet (UV) light, visible light, or both; and the second layer is configured to pass UV light, visible light, or both. In some implementations, the second layer is configured to diffuse UV light, visible light, or both. In some of the foregoing embodiments of the present apparatuses: the second layer is configured to pass visible light, infrared light, or both; and the first layer is configured to block or filter visible light.

In some of the foregoing embodiments of the present apparatuses, the apparatuses further comprise a cover film removeably coupled to the dual switchable adhesive. In some implementations, the first layer is included in a drape, a bandage, a wound closure device, a therapy system adhesive, or a combination thereof.

In some of the foregoing embodiments of the present apparatuses, the dual switchable adhesive, the first layer, the second layer, or a combination thereof, define a plurality of perforations. In some implementations, the dual switchable adhesive is arranged in a pattern.

Some embodiments of the present systems comprise: a medical device including the dual switchable adhesive of any of the foregoing embodiments. In some of the foregoing embodiments of the present systems, the systems further comprise a therapy device coupled to the medical device and configured to provide therapy via the medical device. In some implementations, the systems further comprise a light source configured to emit light to the dual switchable adhesive to transition the dual switchable adhesive from a first phase to a second phase.

In some of the foregoing embodiments of the present systems, the medical device comprises a wound dressing, a bandage, or a wound closure device. In some implementations, the dual switchable adhesive is coupled to a compound film, and the compound film corresponds to a protective film and a drape layer of the wound dressing. In other implementations, the medical device comprises a connector of the system, and the dual switchable adhesive is coupled an interface of the connector and is configured to form a connection point between two components of the system.

Some embodiments of the present methods of manufacturing dual switchable adhesive comprise: providing polymerization initiators to one or more polymers, the polymerization initiators configured to increase a cross-linking of the one or more polymers responsive to receiving moisture; providing photo initiators to the one or more polymers, the photo initiators configured to increase the cross-linking of the one or more polymers responsive to receiving light; and blending the one or more polymers, the polymerization initiators, and the photo initiators to form a polymer composition.

In some of the foregoing embodiments of the present methods, the methods further comprise providing one or more co-initiators configured to assist the first photo initiators, the first photo initiators, or both, in curing the one or more polymers. In some implementations, the one or more the co-initiators include Borate V, Irgacure 184, or both.

In some of the foregoing embodiments of the present methods, the methods further comprise providing one or more solvents configured to increase a solubility of the first photo initiators, the first photo initiators, or both, in the one or more polymers. In some implementations, the one or more solvents include N,N-Dimethylacrylamide (DMAA), ketones, or both. In some of the foregoing embodiments of the present methods, the methods further comprise partially curing the polymer composition by applying heat, light, or both.

In some of the foregoing embodiments of the present methods, the polymer composition comprises a dual switchable adhesive, and the methods further comprise applying the dual switchable adhesive to a film. In some implementations, applying the dual switchable adhesive to the film includes applying a coating of the dual switchable adhesive by a roller, a slot die, or a spray nozzle. In a particular implementation, applying the dual switchable adhesive to the film includes applying the dual switchable adhesive in a pattern. Additionally, or alternatively, the methods may further comprise coupling a cover film to the dual switchable adhesive. In some of the foregoing embodiments of the present methods, the methods further comprise forming perforations in the dual switchable adhesive, the cover film, or a combination thereof.

Some embodiments of the present methods of using dual switchable adhesive comprise: attaching a component to a tissue site via a dual switchable adhesive to form a bond between the component and the tissue site; applying moisture to the dual switchable adhesive to increase a bond strength of the bond between the component and the tissue site; applying light to the dual switchable adhesive to decrease the bond strength of the bond between the component and the tissue site; and removing the component from the tissue site. In some of the foregoing embodiments of the present methods, the methods further comprise applying second light to the dual switchable adhesive to increase or decrease the bond strength of the bond between the component and the tissue site, the second light different from the light.

In some of the foregoing embodiments of the present methods, the methods further comprise, prior to attaching the component, removing a cover film from the dual switchable adhesive. In some implementations, the methods further comprise, after applying the moisture, removing a protective film from the component, wherein removing the protective film enables application of the second light to the dual switchable adhesive.

Some embodiments of the present methods of using dual switchable adhesive comprise: receiving, at a dual switchable adhesive of a component, moisture; responsive to receiving the moisture, transitioning, by the dual switchable adhesive, from a first phase to a second phase; receiving, at the dual switchable adhesive, light; and responsive to receiving the light, transitioning, by the dual switchable adhesive, from the second phase to a third phase. In some of the foregoing embodiments of the present methods, the methods further comprise receiving, at the dual switchable adhesive, second light, the second light different from the light; and responsive to receiving the second light, transitioning, by the dual switchable adhesive, from the third phase to a fourth phase or from a fourth phase to the first phase.

In some of the foregoing embodiments of the present methods, the methods further comprise, after receiving the second light, decreasing, by the dual switchable adhesive, a bond strength between the component and a tissue site. In some implementations, the methods further comprise, after receiving the second light, debonding, by the dual switchable adhesive, the component from a tissue site, wherein the third phase has a lower peel strength than the second phase.

In some of the foregoing embodiments of the present methods, the methods further comprise, responsive receiving the moisture or the light, changing color by the dual switchable adhesive. In some implementations, the methods further comprise, prior to receiving the moisture, bonding, by the dual switchable adhesive, the component to a tissue site. Additionally, or alternatively, the methods further comprise, after receiving the moisture, increasing, by the dual switchable adhesive, a bond strength between the component and the tissue site.

Some embodiments of the present methods of using dual switchable adhesive comprise: applying moisture by a moisture source, the moisture configured to cause a dual switchable adhesive to transition from a first phase to a second phase; and emitting light by a light device, the light and configured to cause the dual switchable adhesive to transition from the second phase to a third phase. In some of the foregoing embodiments of the present methods, the methods further comprise emitting second light by the light device, the second light different from the light and configured to cause the dual switchable adhesive to transition from the first phase to the second phase or from the second phase to the third phase.

In some of the foregoing embodiments of the present methods, the methods further comprise: emitting reference light; determining a distance to a surface based on the reference light; and outputting an indication of the determined distance, wherein the light comprises one of UV light, visible light, or infrared light. In a particular implementation, the light comprises UV light.

In some of the foregoing embodiments of the present methods, the light has a wavelength between 650 nanometers (nm) and 850 nm. Alternatively, the light has as a wavelength between 200 nanometers (nm) and 450 nm.

Some embodiments of the present kits (e.g., a kit for a dual switchable adhesive) comprise: a three phase dual switchable adhesive configured to transition between a first phase and a second phase responsive to receiving one of moisture or light and to transition between the second phase and a third phase responsive to receiving the other of the moisture or light.

In some of the foregoing embodiments of the present kits, the light corresponds to ultraviolet light, and further comprising a light device configured to emit ultraviolet light. Additionally, or alternatively, the moisture includes water or water vapor, and further comprising an applicator including the moisture and configured to apply the moisture.

In some of the foregoing embodiments of the present kits, the applicator comprises a wipe or a spray bottle. In some implementations, the kits further comprise a package that includes the three phase dual switchable adhesive.

Some embodiments of the present kits (e.g., a kit for a dual switchable adhesive) comprise: a pouch; and a sterilized drape including a three phase dual switchable adhesive and positioned within the pouch. In some of the foregoing embodiments of the present kits, the pouch further comprises one or more valves, a window, or both. In some implementations, the one or more valves are configured to enable the pouch to equalize to atmospheric pressure.

In some of the foregoing embodiments of the present kits, the pouch comprises a material that is permeable to ethylene oxide gas and that is a non-permeable to water.

In some implementations, the pouch comprises a second material that is that is a non-permeable to water or the material that is permeable to the ethylene oxide gas is further non-permeable to water. Additionally, or alternatively, the kits further comprise a package that includes the pouch.

As used herein, the term "switchable" will be used to refer to adhesives which can be changed at least from one state or phase (e.g., a high tack and/or peel strength state) to another state or phase (e.g., a low tack and/or peel strength state, such as a non-tacky state). Recognizing that the expression "low tack and/or peel strength" is a relative term, it will be defined here as meaning a condition of a minimum reduction in tackiness which the adhesive reaches after switching from the high tack and/or peel strength state. The reduction in tack or peel force may be as great as 99% or as little as 30%. Typically, the reduction in tack or peel force is between 70% and 90%.

As used herein, the term "peel strength" will be used to refer to a strength of adhesives measured by a 180 degree peel test on stainless steel. Recognizing that a bond strength of adhesive depends on the medium to which it adheres and that tissue composition can vary greatly, the measured peel strength is indicative of the adhesive's bond strength with tissue.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically. Additionally, two items that are "coupled" may be unitary with each other. To illustrate, components may be coupled by virtue of physical proximity, being integral to a single structure, or being formed from the same piece of material. Coupling may also include mechanical, thermal, electrical, communicational (e.g., wired or wireless), or chemical coupling (such as a chemical bond) in some contexts.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. As used herein, the term "approximately" may be substituted with "within 10 percent of" what is specified. Additionally, the term "substantially" may be substituted with "within [a percentage] of" what is specified, where the percentage includes 0.1, 1, or 5 percent; or may be understood to mean with a design, manufacture, or measurement tolerance. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any aspect of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1A is a block diagram of an example of a system for activating a dual switchable adhesive;

FIG. 1B is a side view of an example of a compound film including a dual switchable adhesive;

FIGS. 3A-3D are each a diagram illustrating representative chemical reactions of a dual switchable adhesive;

FIGS. 5A-5D are each a side view of an example of attaching and removing a compound film including dual switchable adhesive from tissue;

FIG. 7A is a diagram of an example of a therapy system including a dual switchable adhesive;

FIG. 7B is a diagram of an example of a drape of the therapy system of FIG. 7A including a dual switchable adhesive;

DETAILED DESCRIPTION

Figure 2A:
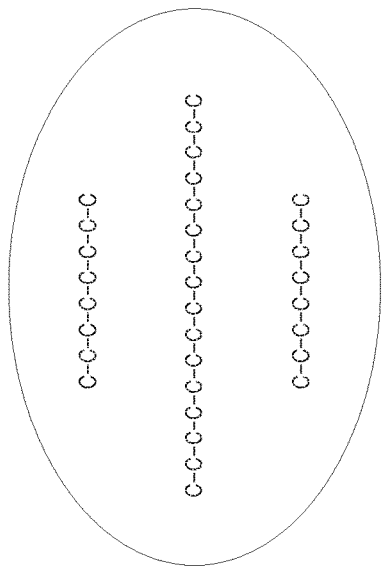
FIG. 2A is diagram illustrating representative chemical reactions of a dual switchable adhesive.

As used herein, the terms "tissue site" and "target tissue" as used herein can broadly refer to a wound (e.g., open or closed), a tissue disorder, and/or the like located on or within tissue, such as, for example, bone tissue, adipose tissue, muscle tissue, neural tissue, dermal tissue, vascular tissue, connective tissue, cartilage, tendons, ligaments, and/or the like. The terms "tissue site" and "target tissue" as used herein can also refer to a surrounding tissue area(s) and/or areas of tissue that are not necessarily wounded or exhibit a disorder, but include tissue that would benefit from tissue generation and/or tissue that may be harvested and transplanted to another tissue location. The terms "tissue site" and "target tissue" may also include incisions, such as a surgical incision. In some implementations, "target tissue" may correspond or refer to a wound, and "tissue site" may correspond or refer to a tissue area(s) surrounding and including the target tissue. Additionally, the term "wound" as used herein can refer to a chronic, subacute, acute, traumatic, and/or dehisced incision, laceration, puncture, avulsion, and/or the like, a partial-thickness and/or full thickness burn, an ulcer (e.g., diabetic, pressure, venous, and/or the like), flap, and/or graft. A wound may include chronic, acute, traumatic, subacute, and dehisced wounds, partial-thickness burns, ulcers (such as diabetic, pressure, or venous insufficiency ulcers), flaps, grafts, and fistulas, for example.

The term "positive-pressure" (or "hyperbaric") as used herein generally refers to a pressure greater than a local ambient pressure, such as the ambient pressure in a local environment external to a sealed therapeutic environment (e.g., an internal volume). In most cases, this positive-pressure will be greater than the atmospheric pressure at which the patient is located. Alternatively, the positive-pressure may be greater than a hydrostatic pressure associated with tissue at the tissue site. Unless otherwise indicated, values of pressure stated herein are gauge pressures. References to increases in positive-pressure typically refer to an increase in absolute pressure, and decreases in positive-pressure typically refer to a decrease in absolute pressure. Additionally, the process of increasing pressure may be described illustratively herein as "applying", "delivering," "distributing," "generating", or "providing" positive-pressure, for example.

The term "reduced-pressure" (and "negative-pressure" or "hypobaric") as used herein generally refers to a pressure less than a local ambient pressure, such as the ambient pressure in a local environment external to a sealed therapeutic environment (e.g., an internal volume). In most cases, this reduced-pressure will be less than the atmospheric pressure at which the patient is located. Alternatively, the reduced-pressure may be less than a hydrostatic pressure associated with tissue at the tissue site. Unless otherwise indicated, values of pressure stated herein are gauge pressures. References to increases in reduced-pressure typically refer to a decrease in absolute pressure, and decreases in reduced-pressure typically refer to an increase in absolute pressure. Additionally, the process of reducing pressure may be described illustratively herein as "applying", "delivering," "distributing," "generating", or "providing" reduced-pressure, for example.

The term "fluid" may refer to liquid, gas, air, or a combination thereof. The term "fluid seal," or "seal," means a seal adequate to maintain a pressure differential (e.g., positive-pressure or reduced-pressure) at a desired site given the particular pressure source or subsystem involved. Similarly, it may be convenient to describe certain features in terms of fluid "inlet" or "outlet" in such a frame of reference. However, the fluid path may also be reversed in some applications, such as by substituting a reduced-pressure source (negative or hypobaric pressure source) for a positive-pressure source, and this descriptive convention should not be construed as a limiting convention.

FIG. 1A illustrates a block diagram of an illustrative system 100 for activating a dual switchable adhesive. System 100 includes a dual switchable adhesive (DSA) 110 (e.g., a three or more phase dual switchable adhesive), a light device 112, and a moisture source 114. DSA 110 includes two or more different types of curing systems, such as a moisture curing system and a light curing system. DSA 110 may include or correspond to a moisture switchable adhesive (MSA) and a light switchable adhesive (LSA).

System 100 is configured to activate the DSA 110 to transition or switch the DSA 110 between multiple phases, such as from a first phase 142 to a second phase 144, and from the second phase 144 to a third phase 146. For example, system 100 may apply light of a particular wavelength(s) to DSA 110 to activate photo initiators 122 thereof to control a peel strength of the DSA 110 and apply a particular type of moisture (e.g., chemical compound in a liquid or gas state) to DSA 110 to activate polymerization initiators 124 thereof to control a peel strength of the DSA 110. One such exemplary use of DSA 110 is as a repositionable light and moisture switchable adhesive for medical applications and devices.

The DSA 110 includes or correspond to a pressure sensitive adhesive. As illustrated in FIG. 1A, the DSA 110 includes one or more polymers 120, photo initiators 122, and polymerization initiators 124. The one or more polymers 120, the photo initiators 122, and the polymerization initiators 124 may include or correspond to a polymer composition. Although a single type of photo initiator and a single type of polymerization initiator are illustrated in FIG. 1A, additional types of photo initiators and/or polymerization initiators may be included in other implementations. DSA 110 may include a light curing system of a light switchable adhesive as described in International Patent Application Nos. PCT/US2018/049388 and PCT/US2018/060718, which are incorporated by reference herein to the extent they describe light switchable adhesives.

The one or more polymers 120 may include chains of one or more monomers (e.g., polymer chains) and free monomers. The one or more polymers 120 may include or correspond to an uncured or partially cured polymer composition and may be cured (or partially cured) responsive to receiving light from the light device 112 and moisture from the moisture source 114. In some implementations, the one or more polymers 120 are acrylic based, such as includes acrylate, urethane acrylate, alkoxy acrylate, and/or silicone acrylate based polymers and oligomers. The one or more polymers 120 may include or further include polyether, polyurethane, methacrylate, or a combination thereof.

The photo initiators 122 (e.g., first type curing initiators) are configured to cause cross-linking of monomers and/or polymer chains of the one or more polymers 120 to increase a degree of cross linking of the one or more polymers 120 or a degree of curing of the one or more polymers 120 responsive to receiving light of a particular wavelength, i.e., first light. For example, the photo initiators 122 are configured to generate free radicals (e.g., first free radicals) responsive to receiving first light 132 from the light device 112. The free radicals are configured to active the one or more polymers 120 (e.g., monomers or polymer chains thereof) to increase bonding between the one or more polymers 120, such as increase polymer chain lengths, reduce free monomers, or both, as described further with reference to FIGS. 2A-2D.

As an illustrative, non-limiting example, the photo initiators 122 include ultraviolet (UV) type photo initiators, i.e., photo initiators that are activated by light near or within the ultraviolet spectrum. Additionally, or alternatively, the photo initiators 122 include visible light type photo initiators or infrared (IR) type photo initiators. Exemplary photo initiators are described further with reference to FIGS. 2A-2D and 5A-5C.

The photo initiators 122 may have a concentration (e.g., weight percentage) of 0.5 to 10 percent of the total weight of the DSA 110 (polymer composition). In a particular implementation, the photo initiators 122 have a concentration (e.g., weight percentage) of 2 to 6 percent of the total weight of the DSA 110 (polymer composition).

Similarly, the polymerization initiators 124 (e.g., second type curing initiators) are configured to cause cross-linking of monomers and/or polymer chains of the one or more polymers 120 to increase a degree of cross linking of the one or more polymers 120 or a degree of curing of the one or more polymers 120 responsive to receiving light of a particular wavelength. For example, the polymerization initiators 124 are configured to increase curing responsive to receiving moisture 134 from the moisture source 114. In some implementations, the polymerization initiators 124 cause a condensation reaction responsive to receiving moisture 134 from the moisture source 114. The polymerization initiators 124 may proceed in a stepwise fashion to produce an addition reaction (generate an adduct) and release a byproduct. The addition reaction increases a chain length of the one or more polymers 120 and may increase cross-linking of the one or more polymers 120. In other implementations, the polymerization initiators 124 generate free radicals (e.g., second free radicals) responsive to receiving moisture 134 from the moisture source 114. The free radicals are configured to active the one or more polymers 120 (e.g., monomers or polymer chains thereof) to increase bonding between the one or more polymers 120, such as increase polymer chain lengths, reduce free monomers, or both.

The polymerization initiators 124 may have a concentration (e.g., weight percentage) of 0.5 to 10 percent of the total weight of the DSA 110 (polymer composition). In a particular implementation, the polymerization initiators 124 have a concentration (e.g., weight percentage) of 2 to 6 percent of the total weight of the DSA 110 (polymer composition).

In some implementations, the DSA 110 includes one or more additives 126. The additive 126 may include or correspond to additives to increase dissolution of the photo initiators 122, the polymerization initiators 124, or both in a particular polymer or to increase free radical production and/or curing. For example, DMAA (N,N-Dimethylacrylamide) and/or ketones can be used to increase solubility of photo initiators 122 in acrylate resins. As another example, certain co-initiators, such as Borate V or Irgacure 184, may increase a speed of free radical cure.

Additionally, or alternatively, the additives 126 include a marking additive, such as an IR marking additive, a UV marking additive, or a visible light marking additive. Such marking additives may produce a visual indication, such as a color change, text, a symbol, etc., to indicate that light of a particular wavelength which may activate DSA 110 has been received or that a transition of states has occurred.

In a particular implementation, the UV marking additive includes or corresponds to an ultraviolet absorber (UV absorber). A UV absorber is a molecule used in organic or synthetic materials to absorb UV radiation. The UV absorbers are configured to absorb at least a portion of UV radiation of the UV spectrum and produce a visual indication, such as a color change. For example, UVA absorbers are configured to absorb UVA radiation, i.e., electromagnetic radiation having wavelengths between 300 and 400 nm. Additionally, or alternatively, one or more other layers of a compound film 152 may include a UV marking additive or another additive, such as a visible light additive. For example, a first layer (e.g., 192, such as a light blocking layer or protective film) and/or a second layer (e.g., 194, such as a non-light blocking layer or adhesive layer) may include a marking additive. Such marking additives may produce a color change, produce text, produce a symbol, etc. to indicate light which may activate DSA 110 has been received.

Additionally, or alternatively, the reaction or reactions caused by a particular photo initiator may provide a visual indication. To illustrate, IR photo initiators may produce a color change upon receiving light and producing a free radical, upon the free radical altering a monomer/polymer, upon cross-linking or combining of monomers/polymers, or a combination thereof.

In some implementations, such as for UV photo initiators, the photo initiators 122 have a peak absorbance between 200 nanometers (nm) to 400 nm. In a particular implementation, the photo initiators 122 have a peak absorbance of about 385 nm. In other implementations, such as for IR photo initiators, the photo initiators 122 have a peak absorbance between 750 nanometers (nm) to 860 nm. In a particular implementation, the photo initiators 122 have a peak absorbance of about 780 nm or about 815 nm.

In some implementations, DSA 110 has a peel strength of less than 7 N/25 mm on stainless steel at an angle of 180 degrees at room temperature in the first phase 142. In a particular implementation, DSA 110 has a peel strength between 4N/25 mm and 6N/25 mm on stainless steel at an angle of 180 degrees at room temperature in the first phase 142. In some such implementations, the dual switchable adhesive has a peel strength of greater than 8 N/25 mm on stainless steel at an angle of 180 degrees at room temperature in the second phase 144. In a particular implementation, DSA 110 has a peel strength of greater than 15N/25 mm on stainless steel at an angle of 180 degrees at room temperature in the first phase 142. In another implementation, DSA 110 has a peel strength between 10N/25 mm and 15N/25 mm on stainless steel at an angle of 180 degrees at room temperature in the first phase 142. Additionally, or alternatively, the dual switchable adhesive has a peel strength of less than 7 N/25 mm on stainless steel at an angle of 180 degrees at room temperature in a third phase 146. In a particular implementation, the DSA has a peel strength between 3N/25 mm and 6N/25 mm on stainless steel at an angle of 180 degrees at room temperature in a third phase.

In some implementations, DSA 110 has an areal weight of 50 to 300 grams per square meter (gsm). In a particular implementation, DSA 110 has an areal weight of 100 to 250 grams per square meter (gsm). In some implementations, DSA 110 has a moisture vapor transfer rate (MVTR) of greater than 250 g/m$^2$ in the first phase 142, the second phase 144, or both. In a particular implementation, LSA 110 has a MVTR of 250 g/m$^2$ to 1000 g/m$^2$ in the first phase 142, the second phase 144, or both. In other implementations, the LSA has a MVTR of greater than 1000 g/m$^2$ in the first phase 142, the second phase 144, or both.

Additionally, or alternatively, LSA 110 has a viscosity which produces 7 mm to 11 mm of cone penetration according to ISO 2137, alternatively referred to as 70 mm/10 to 110 mm/10, in the first phase 142, the second phase 144, or both, in some implementations. In a particular implementation, LSA 110 has a viscosity which produces 9 mm of cone penetration according to ISO 2137, alternatively referred to as 90 mm/10, in the first phase 142, the second phase 144, or both. To illustrate, the viscosity is measured by a penetrometer according to the standard Norfolk Island (NF) International Organization for Standardization (ISO) 2137, using a penetrometer PNR 12 Petrotest model with a total weight of the rod and cone attached thereto is 62.5 grams. Cone penetration of a sample (i.e., the DSA 110) in a container is determined at 25° C. by measuring the depth of penetration of the cone penetrometer into the sample after releasing the cone penetrometer and allowing the cone penetrometer to act for 5 seconds. The measured penetration depth is often multiplied by 10 and notated in "N" mm/10.

The light device 112 is configured to provide light to activate DSA 110 (i.e., photo initiators 122, second photo initiators, or both, thereof) and cause DSA 110 to switch phases (e.g., 142 to 144 or 144 to 146), also referred to as states. Light device 112 may include or correspond to the Sun, ambient lighting, a dedicated light device, such as an infrared (IR) device, a visible light device, an ultraviolet (UV) device, a dual light device, or a combination thereof.

An exemplary UV device is configured to generate/emit UV light to activate DSA 110 (photo initiators thereof) and cause DSA 110 to switch phases (e.g., 142 to 144 or 144 to 146). For example, UV device includes or corresponds to a UV light source configured to generate light or electromagnetic radiation having a wavelength of 10-500 nanometers, such as UV light to blue light. In some implementations, UV device may include or correspond to a UV torch. For example, UV torch may include one or more LEDs configured to generate incoherent light in the UV spectrum. In a particular implementation, UV torch generates light in a particular subspectrum of the UV spectrum, such as UVA or UVC.

In other implementations, the UV device may include or correspond to a UV Laser, such as a gas laser, a laser diode, a solid-state laser, an excimer laser, or a combination thereof. In some implementations, UV laser is configured to generate coherent light (e.g., a laser beam) having electromagnetic radiation of UV wavelengths. For example, UV laser is a UVA laser (315-400 nm), a UVB laser (280-315 nm), a UVC laser (100-280 nm), or an extreme UV laser (10-121 nm).

An exemplary IR device is configured to generate/emit IR light to activate DSA 110 (photo initiators thereof) and cause DSA 110 to switch phases (e.g., 142 to 144 or 144 to 146). For example, IR device includes or corresponds to a IR light source configured to generate IR light or electromagnetic radiation having a wavelength of 700 nanometers (nm)—1 millimeter (mm). In some implementations, IR device may include or correspond to a IR torch. For example, IR torch may include one or more LEDs configured to generate incoherent light in the IR spectrum. In a particular implementation, IR torch generates light in a particular subspectrum of the IR spectrum, such as near-infrared (NIR or IR-A) or short-wavelength infrared (SWIR or IR-B).

In other implementations, the IR device may include or correspond to an IR Laser, such as a gas laser, a laser diode, a solid-state laser, an excimer laser, or a combination thereof. In some implementations, IR laser is configured to generate coherent light (e.g., a laser beam) having electromagnetic radiation of IR wavelengths. For example, IR laser is a IR-A laser (700-1400 nm), a IR-B laser (1400-3000 nm), or an IR-C laser (3000 nm-1 mm).

An exemplary visible light device is configured to generate/emit visible light to activate DSA 110 (photo initiators thereof) and cause DSA 110 to switch phases (e.g., 142 to 144 or 144 to 146). For example, visible device includes or corresponds to a visible light source configured to generate light or electromagnetic radiation having a wavelength of about 400-700 nanometers, such as violet light to red light. In some implementations, the visible light device may include or correspond to a visible light torch. For example, visible light torch may include one or more LEDs configured to generate incoherent light in the visible light spectrum. In a particular implementation, the visible light torch generates light in a particular subspectrum of the visible light spectrum, such as green light or orange light. In another implementations, the visible light torch generates light in various subspectrums of the visible light spectrum, such as violet, blue, green, yellow, etc. to generate "white" light.

Similarly, the moisture source 114 is configured to provide moisture 134 to activate DSA 110 (polymerization initiators 124 thereof) and cause DSA 110 to switch phases (e.g., 142 to 144 or 144 to 146). Moisture source 114 may include or correspond to environmental or ambient moisture (e.g., humidity, tissue moisture, etc.), a dedicated moisture source such as a wipe, an applicator (e.g., a spray bottle), or a combination thereof. In such implementations where the moisture source 114 is a dedicated moisture source/device (e.g., a wipe or an applicator), the moisture source 114 may be configured to apply moisture 134 to the DSA 110, such as atomized water droplets, steam, liquid water, etc. In some implementations, the moisture 134 includes or corresponds to water, such as sterilized water, de-ionized water, etc. In other implementations, the moisture 134 includes or corresponds to a solution, such as water mixed with a urea, an amine, an alcohol, etc., or a combination thereof. In some such implementations, one part of the solution activates the polymerization initiators 124 and another part of the solution performs another function, such as antiseptic or sterilization. Alternatively, multiple or both parts of the solution activate the polymerization initiators 124.

Optionally, system 100 includes a light source 116 in addition to or in the alternative of light device 112. Similarly, in some implementations, the light source 116 is configured to provide light to activate DSA 110 and cause DSA 110 to switch phases (e.g., 142 to 144 or 144 to 146). Light source 116 may include or correspond to the Sun, ambient lighting, a second dedicated light device, such as an ultraviolet (UV) device, or a combination thereof. In such implementations where the light source 116 is a second dedicated light device, the light source 116 may include or correspond to one or more components described with reference to the light device 112.

Although two polymerization initiators are illustrated in FIG. 1A, in other implementations additional polymerization initiators may be used. For example, DSA 110 may include, in some implementations, second photo initiators configured to respond to the second light 136. The second photo initiators (e.g., third polymerization initiators) can be used to augment or supplement (e.g., speed up) a particular transition, e.g., from the second phase 144 to the third phase 146 to facilitate removal, or the second photo initiators can be used to add an additional phase or state, such as a fourth phase or state. For example, the second photo initiators are configured to be activated responsive to receiving the second light 136, and the photo initiators 122 and the second photo initiators (which are similar to the photo initiators 122) transition DSA 110 from the first phase 142 to the second phase 144 or from the second phase 144 to the third phase 146.

Alternatively, the second photo initiators (e.g., third polymerization initiators) can be used to add an additional phase or state. An additional phase or state can be used in attachment of the DSA 110, i.e., to get a larger increase in peel/bond strength, or in the removal of the DSA 110, i.e., to get a larger decrease in peel/bond strength. In some such implementations, the second photo initiators (e.g., third polymerization initiators) include or correspond to visible light photo initiators. As illustrative, non-limiting examples, the visible light photo initiators include or correspond to H-Nu-Blue 660, H-Nu-Blue 660, or a combination thereof.

One particular use for DSA 110 is illustrated in FIG. 1B. Other examples of use and manufacture of a DSA, such as DSA 110, are described with reference to FIGS. 5A-5D, 7A, and 8. Referring to FIG. 1B, a side view of a particular example of a compound film 152 including a dual switchable adhesive is illustrated. In FIG. 1B, compound film 152 includes a first layer 192 (e.g., a protective film), a second layer 194 (e.g., a DSA host layer or adhesive layer), DSA 110, and an optional cover film 198.

Layers 192, 194 may include polymer films. In a particular implementation, the layers 192, 194 have similar polymer materials or the same polymer material. For example, one or more of layers 192, 194 may be polyurethane (PU) films, polyethylene (PE) films, etc. In dual switchable adhesive related applications, one of layers 192, 194 is a light blocking film with respect to at least a first type of light (e.g., 132 or 136) and the other of layers 192, 194 is a non-light blocking film or light passing (e.g., transmitting) film with respect to the first type of light. In some implementations, the second layer 194 may include or correspond to a drape film. As described further herein, layers 192, 192 may include an impermeable or semi-permeable, elastomeric material, as an illustrative, non-limiting example. In some implementations, compound film 152 may be liquid/gas (e.g., moisture/vapor) impermeable or semi-permeable.

Compound film 152 is configured to be separable. In the example illustrated in FIG. 1B, the first layer 192 is a removable protective film, also referred to as a light blocking layer, and the second layer 194 is a non-light blocking layer (e.g., a light transmitting or passing layer). As compared to conventional compound films for conventional light switchable adhesives (e.g., two phase LSA), the compound films 152 described herein may include an additional protective film or light blocking layer corresponding to a second type of light (e.g., different light from the first type of light), such as to filter or block the first light 132 and/or the second light 136.

Additionally, one or more layers 192, 194 of the compound film 152 are further configured to transmit or allow the passage of fluid. Such films may include a relatively high moisture transfer capability, such as a moisture vapor transfer rate of (MVTR) of greater than 250 g/m². Alternatively, such films may be moisture wicking (e.g., absorb or draw fluids by capillary action). In some such implementations where the DSA 110 is configured to (designed to) have a moisture based transition from the first 142 phase to the second phase 144, both layers 192, 194 may be configured to transmit or allow the passage of fluid, such as water.

In some implementations, the first layer 192 of the compound film 152 described herein may be configured to block light of multiple different spectrums, such as to filter or block the first light 132 and the second light 136. Additionally, in such implementations, the second layer 194 of the compound films 152 described herein may be configured to pass or transmit light of multiple different spectrums, such as the first light 132 and the second light 136. Accordingly, the compound film 152 supports blocking and receiving multiple types of light to control activation of the photo initiators 122 of the DSA 110.

As illustrated in the example of FIG. 1B, the first layer 192 is in direct contact with the second layer 194, and the DSA 110 is in direct contact with the second layer 194. That is, compound film 152 does not include a handing or support layer or an adhesive layer between the first layer 192 and the second layer 194. In conventional light switchable adhesives, which are often thinner and less viscous, a support or handling layer is included in a compound film to provide handling of the compound film including the conventional light switchable adhesive during production, transportation, attachment, or a combination thereof. In a particular implementation, first layer 192 includes a tab (e.g., 544) to enable easy removal of the first layer 192 from the compound film 152. The tab may extend outwards and/or upwards from the compound film 152 to facilitate removal or first layer 192 from second layer 194.

First layer 192 is configured to be removed from second layer 194 while second layer 194 is bonded to a bond site, such as a tissue site (e.g., 520, 720). First layer 192 is configured to block or filter light of a particular wavelength associated with transitioning the DSA 110 from the first phase 142 to the second phase 144, and second layer 194 is configured to pass or transmit the light of the particular wavelength associated with transitioning the DSA 110 from the second phase 144 to the third phase 146. For example, the first layer 192 may be configured to block or filter UV light wavelengths, visible light wavelengths, or both and/or the second layer 194 may be configured to pass UV light wavelengths, visible light wavelengths, or both. To illustrate, the first layer 192 is configured to block or filter light having a wavelength between 10 nanometers and 500 nanometers and/or the second layer 194 is configured to pass light having a wavelength between 10 nanometers and 500 nanometers. In other implementations, the light which is blocked or filtered by the first layer 192 and/or passed by second layer 194 includes or corresponds to visible light, a portion of the visible light spectrum, UV light, a portion of the UV light spectrum, or a combination thereof. In a particular implementation, the first layer 192 is opaque and the second layer 194 is optically transparent. To illustrate, the first layer 192 blocks visible light and the second layer 194 passes a majority to all of visible light (with or without diffusion).

In a particular implementation, first layer 192 and second layer 194 are configured to be permeable to air and water vapor, to enable tissue of tissue site to which the compound film 152 is bonded to "breathe." First layer 192 and second layer 194 of compound film 152 may include an impermeable or semi-permeable, elastomeric material, as an illustrative, non-limiting example. In some implementations, first layer 192 and/or second layer 194 are liquid/gas (e.g., moisture/vapor) impermeable or semi-permeable. Additionally, or alternatively, first layer 192 and/or second layer 194 include or are elastomeric material. "Elastomeric" means having the properties of an elastomer. For example, elastomer generally refers to a polymeric material that may have rubber-like properties. More specifically, an elastomer may typically have ultimate elongations greater than or equal to 100% and a significant amount of resilience. The resilience of a material refers to the material's ability to recover from an elastic deformation. Elastomers that are relatively less resilient may also be used as these elastomers. Examples of elastomers may include, but are not limited to, natural rubbers, polyisoprene, styrene butadiene rubber, chloroprene rubber, polybutadiene, nitrile rubber, butyl rubber, ethylene propylene rubber, ethylene propylene diene monomer, chlorosulfonated polyethylene, polysulfide rubber, polyurethane (PU), EVA film, co-polyester, and silicones.

In some implementations, second layer 194 is configured to diffuse light to DSA 110, such as light received from a top (e.g., when first layer 192 is removed) and/or a side of second layer 194. To illustrate, light (e.g., 132 and/or 136) received on a side of second layer 194 is scattered as it passes through second layer 194 to distribute the light to the DSA 110. Additionally, or alternatively, second layer 194 may be formed of a thin, clear, flexible, breathable material with a high refractive index. One exemplary material for the second layer 194 is polyurethane (PU).

DSA 110 may be applied to or disposed on second layer 194 after compound film 152 is formed, as described with reference to FIG. 8. In some implementations, DSA 110 is a coating or a pattern of coatings, as described further herein. Alternatively, DSA 110 may be formed with one or more films of the compound film 152, such as co-extruded with second layer 194.

Compound film 152 may be configured to couple a bandage, a wound closure device, a dressing, and/or a drape, to provide a seal to create an enclosed space (e.g., an interior volume) corresponding to a tissue site. For example, compound film 152 may be configured to provide a fluid seal (i.e., provide a portion of fluid seal) between two components and/or two environments, such as between a sealed therapeutic environment and a local ambient environment. To illustrate, when coupled to a tissue site, compound film 152 is configured to maintain a pressure differential at the tissue site and/or keep fluids from permeating through the compound film 152, as described further with reference to FIG. 7A.

In some implementations, DSA 110 has or is configured to provide a bond strength (e.g., peel strength) for the compound film 152 of at least at or greater than, or substantially equal to any one of, or between two of: 3, 4, 5, 6, 8, 10, 12, 14, 16, 18, or 20 N, in the second phase 144. The bond may be formed by DSA 110 between second layer 194 and a bond site, such as target tissue of a tissue site. To illustrate, DSA 110 may have a bond strength as described above or may be applied such that compound film 152 has a bond strength as described above, such as when DSA 110 is patterned on compound film 152. In some implementations, the bond strength of the DSA 110 increases after application of DSA 110 to the bond site (e.g., tissue site). For example, the bond strength of the DSA 110 may achieve (e.g., reach) a maximum bond strength between 30 minutes to 24 hours after application. Additionally, or alternatively, DSA 110 has or is configured to provide a bond strength (e.g., peel strength) at least at or greater than, or substantially equal to any one of, or between two of: 0.3, 0.5, 1, 2, 3, 4, 5, 6, 8, or 10 N, in the third phase 146 after being exposed to first light 132 or second light 136. The peel strength values for DSA 110/compound film 152 or bond strength of DSA 110/compound film 152 are described in terms of a peel strength as measured by a 180 degree peel test on stainless steel. The peel strength values for DSA 110/compound film 152 or bond strength of DSA 110/compound film 152 may be indicative of a bond strength with human tissue at a particular time, such as two hours after application of DSA 110/compound film 152.

The compound film 152 may be post processed as described further herein. For example, the compound film 152 may be perforated and/or may be coupled, bonded to, or compound with one or more additional films or layers. In some implementations, a dual switchable adhesive is applied to compound film 152, as described further with reference to FIG. 8.

As described above, layers 192, 194 of compound film 152 are removable/separable, i.e. are designed to be removed from each other during operation of the compound film 152. An example of operation of a compound film including a DSA 110 is described further with reference to FIGS. 5A-5D.

In some implementations, a dual switchable adhesive (e.g., three or more phase dual switchable adhesive) includes one or more polymers; polymerization initiators configured to cause the one or more polymers to cross-link responsive to receiving moisture; and photo initiators configured to cause the one or more polymers to cross-link responsive to receiving light.

In a particular implementation, the dual switchable adhesive has at least three states, each state corresponding to a particular peel strength, and wherein the dual switchable adhesive is configured to transition between a first two states of the three states based on activation of the polymerization initiators and to transition between a second two states of the three states based on activation of the photo initiators. Additionally or alternatively, the dual switchable adhesive has a second peel strength in the second state that is greater than a first peel strength of the dual switchable adhesive in the first state, and wherein a third peel strength of the dual switchable adhesive in the third state is less than the second peel strength.

In other implementations, the dual switchable adhesive is configured to transition between a first two states of the three states based on activation of the photo initiators and to transition between a second two states of the three states based on activation of the polymerization initiators.

In some implementations, the dual switchable adhesive is included in a compound film. In a particular implementation, a compound film includes a first layer of a first polymer composition; a second layer of a second polymer composition, the second layer removeably coupled to the first layer; and a dual switchable adhesive, such as the dual switchable adhesive described above.

Thus, system 100 describes an improved dual switchable adhesive. The dual switchable adhesive described herein, such as DSA 110, include additional phases and may have a low tact/peel strength first phase for easier use. Therefore, DSA 110 is suitable for use in medical devices, such as bandages, drapes, dressings, and wound closures. DSA 110 enables medical devices to be repositionable, thereby avoiding or limiting waste from inadvertent contact and misplacement and avoiding or limiting tissue damage at tissue site and patient discomfort from repositioning. Accordingly, DSA 110 may enable improved wound care and therapy, thereby advancing patient comfort and confidence in the treatment.

FIG. 2A illustrates an illustrative chemical reaction process for an exemplary curing initiator, such as photo initiators 122 or polymerization initiators 124. FIG. 2A illustrates free-radical polymerization (FRP) reactions. FRP is a method of polymerization (chain-growth polymerization) by which a polymer forms or increases in chain length by the successive addition of free-radical building blocks. In DSA (e.g., 110), the free radicals are formed by the polymerization initiators receiving moisture or light. The free radical adds (nonradical) monomer units to an existing polymer chain, thereby growing the polymer chain.

Different types of polymerization initiators generate different types of free radicals. As an illustrative example, a free radical is created by breaking an oxygen-oxygen bond (O—O bond) in a peroxide, such as benzoyl peroxide. Exemplary free radicals are capable of attacking an carbon-carbon double bound (C=C bond), such as an olefinic double bond of a vinyl monomer.

The free radical is then transferred to the monomer, forming an active center that can attach to other monomers. This step is called propagation, in which the free radical is propagated down the polymer chain. The final step is termination, in which two molecules containing free radicals react and form the final product.

Monomer molecules add onto the active site of a growing polymer chain one at a time. Growth of the polymer occurs at the active sites on the chain, which are typically at the chain-end(s). The addition of each monomer unit to the growing polymer chain regenerates the active site, enabling an additional monomer unit to be added. In chain-growth polymerization, an activated species (initiator or active center) adds one monomer molecule to create a new active center (propagation step), which again adds another monomer molecule to create another active center and so on, so that the chain growth proceeds as a chemical chain reaction.

As illustrated in FIG. 2A, a polymerization initiator (I1) (e.g., a moisture based polymerization initiator) receives fluid and undergoes a chemical reaction to produce free radicals (R1). The fluid may be in the form of moisture, i.e., diffused liquid or gas. The free radicals (R1) bond with a carbon-carbon double bond (C=C) and in the process break one of the bonds of the carbon-carbon double bond. The newly formed carbon and free radical chain bonds with other chains including carbon-carbon double bonds. Chains having free radical ends bond to each other. Accordingly, the resulting reactions from the polymerization initiator receiving light increase a degree of cross-linking of the polymers of the DSA.

Figure 3C:
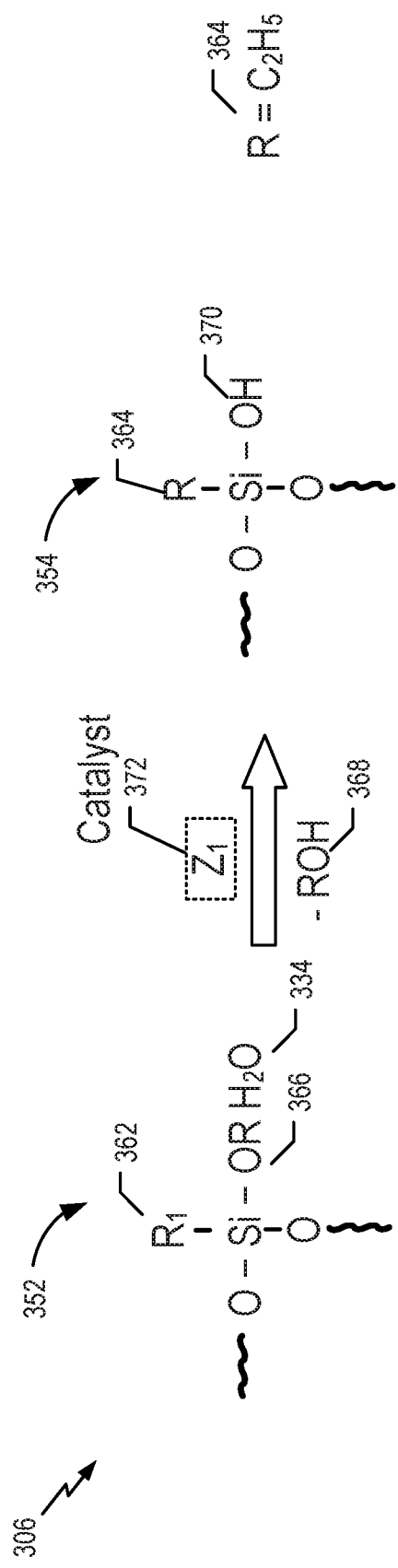
Figure 3D:
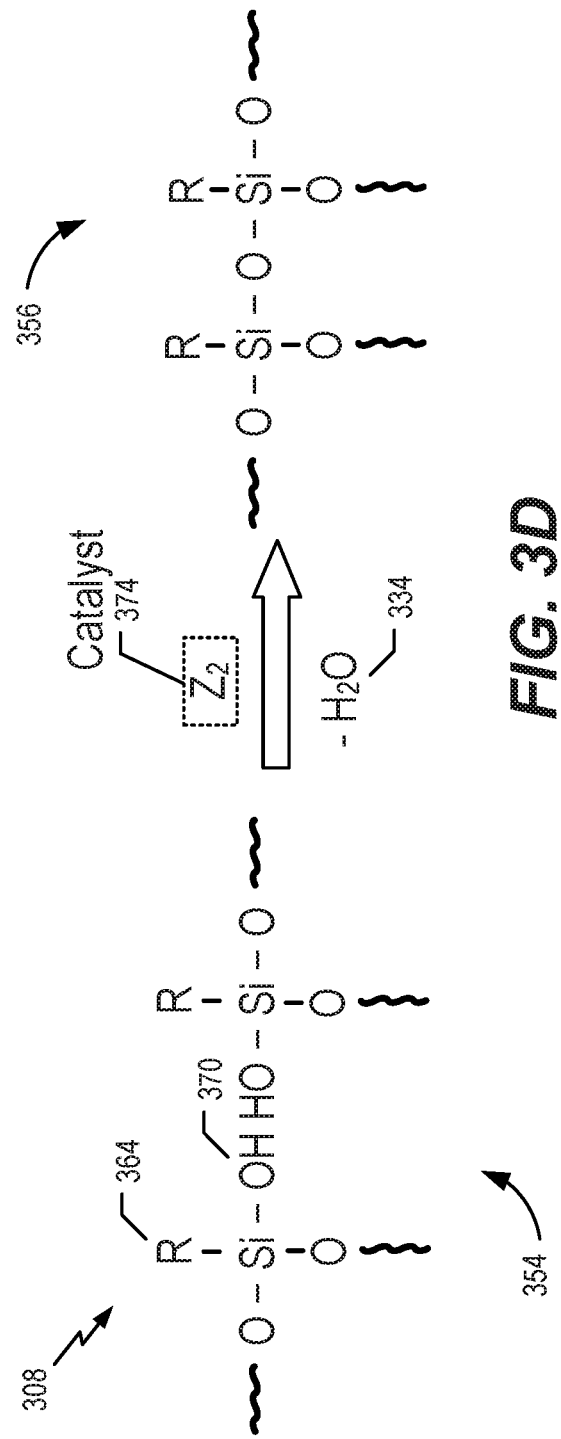

Additionally, or alternatively, step-growth polymerization (also referred to as polyaddition or polycondensation) may be initiated by a polymerization initiator (or another curing initiator. Step-growth polymerization is a method of polymerization by which a polymer forms or increases in chain length by the successive addition of functional groups. During step-growth polymerization, bi-functional or multi-functional monomers react to form first dimers, then trimers, longer oligomers and eventually long chain polymers. In polyaddition, the propagation steps are addition reactions and no molecules are evolved during these steps, and in polycondensation the propagation steps are condensation reactions and molecules are evolved during these steps. An Exemplary step-growth polymerizations are illustrated in FIG. 3B and FIGS. 3C and 3D. In addition, chain-growth polymerization and step-growth polymerization reactions with respect to molecular weight are illustrated in FIG. 4B.

Figure 2B:
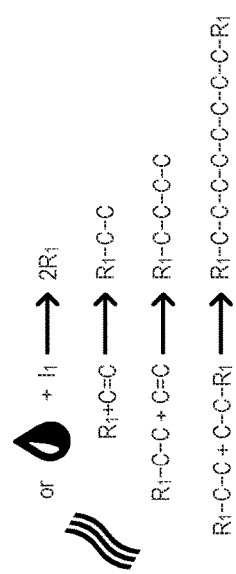
FIGS. 2B-2D are each a representative chemical view of phases of an example of a dual switchable adhesive.
Figure 2C:
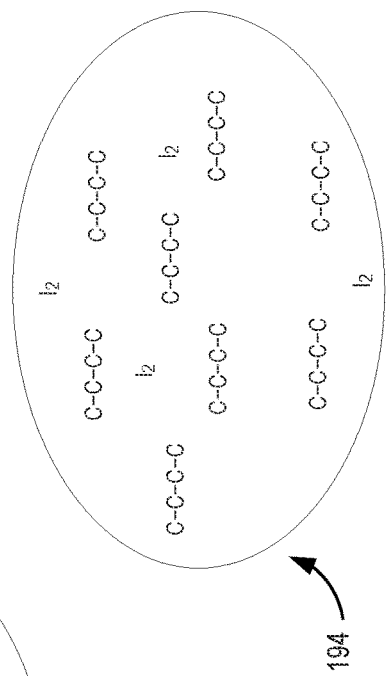
Figure 2D:
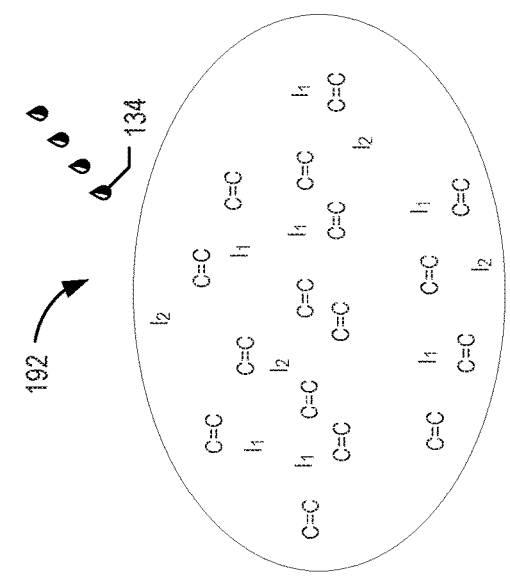

Referring to FIGS. 2B-2D, exemplary states of a DSA, such as DSA 110, are illustrated in representative chemical form. FIG. 2B illustrates a first state or first phase (e.g., 142) of the DSA that has a low level of cross-linking and unactivated polymerization initiators. As illustrated in FIG. 2B, the DSA includes many short molecules including a carbon-carbon double bond (C=C). These molecules represent monomers or short polymer chains. The DSA also includes multiple types of polymerization initiator molecules, (I1, I2).

FIG. 2C illustrates a second state or second phase (e.g., 144) of DSA that has a medium level of cross-linking and unactivated polymerization initiators of a second type. As illustrated in FIG. 2C, the DSA includes many medium molecules including a carbon-carbon single bond (C—C). These short molecules represent monomers or short polymer chains. The DSA includes only second polymerization initiator molecules (I2), as the first polymerization initiator molecules (I1) have been activated or used up when moisture 134 was applied to the DSA in the first state. The first polymerization initiator molecules (I1) may initiate chain-growth polymerization (e.g., free-radical polymerization) or step-growth polymerization.

FIG. 2D illustrates a third state or third phase (e.g., 146) of DSA that has a high level of cross-linking and no unactivated polymerization initiators. As illustrated in FIG. 2D, the DSA includes a few longer polymer molecules including repeating monomers connected by a carbon-carbon single bond (C—C). The DSA also no longer includes any polymerization initiator molecules, (I1, I2), as the second polymerization initiator molecules (I2) have been activated or used up when second light was applied to the DSA in the second state. The second polymerization initiator molecules (I2) may initiate chain-growth polymerization (e.g., free-radical polymerization) or step-growth polymerization. Corresponding peel strengths and curing/cross-linking levels for each state may be illustrated in FIG. 4A.

FIGS. 3A-3D illustrate chemical formulas and reactions for exemplary curing systems of a DSA, such as DSA 110. FIGS. 3A and 3B illustrate chemical formulas and reactions for a urethane acrylic dual cure system. The urethane acrylic dual cure system depicted in FIGS. 3A and 3B illustrates an acrylate cure mechanism with UV light and an isocyanate cure mechanism with water. FIGS. 3C and 3D illustrate chemical formulas and reactions for an alkoxy acrylic dual cure system. The alkoxy acrylic dual cure system depicted in FIGS. 3C and 3D illustrates an ethoxy cure mechanism with water. The alkoxy acrylic dual cure system depicted in FIGS. 3C and 3D may also utilize light curing, such as the acrylate cure mechanism with UV light illustrated in FIG. 3A.

Referring to FIG. 3A, an illustrative chemical reaction process for an exemplary UV curing is depicted as diagram 302. An unsaturated acrylate group (R1) 324 reacts with UV light 332 to undergo chain-growth polymerization. As illustrated in FIG. 3A, a polymer 312 (e.g., an unreacted polymer with respect to light and/or moisture curing) includes a polymer chain (represented by wavy line 342) that links urethane 322 (a urethane functional group, $NHCO_2$) with acrylate 324 (an unsaturated acrylate functional group, R1). In FIG. 3A, polymer 312 includes or corresponds to urethane acrylate. After exposure to UV light 332, the unsaturated acrylate functional group (R1) 324 polymerizes responsive to reactions caused by photo initiators (e.g., 122). For example, the photo initiators generate free radicals and initiates chain-growth polymerization, as described with reference to FIG. 2A. The acrylate functional group polymerizing corresponds to the acrylate functional group forming polymer chain links with other polymers. The polymer 312 is chemically changed into polymer 314 by UV light 332.

As illustrated in FIG. 3A, the polymers 312, 314 (urethane acrylate) include (e.g., is bonded to) one or more isocyanate groups 326. As illustrated in FIG. 3A, the urethane 322 is bonded to the one or more isocyanate groups 326 via one or more other atoms or molecules. The isocyanate groups 326 may include or correspond to polymerization initiators, such as polymerization initiators 124. The isocyanate groups (e.g., polymerization initiators) may react with a solution to cure the polymer. The isocyanate groups may be activated prior to or after the light curing illustrated in FIG. 3A and activation of isocyanate groups 326 is described with reference to FIG. 3B.

Referring to FIG. 3B, an illustrative chemical reaction process for an exemplary polymerization initiator, an isocyanate functional group, is depicted as diagram 304. In FIG. 3B, an isocyanate group 326 (R—NCO) reacts with water 334 ($H_2O$) to produce a polyurea 330. As illustrated in FIG. 3B, an amine (R—$NH_2$) 328 functional group is produced and carbon dioxide ($CO_2$) is released.

Urea (aka carbamide) is an organic compound with the chemical formula $(NH_2)_2CO$. The molecule has two amine groups (R—$NH_2$) joined by a carbonyl functional group (C=O). In a polyurea, alternating monomer units of isocyanates and amines may react with each other to form urea linkages. The reaction of the isocyanate 326 and water 334 forms a carbamic acid intermediate (not shown). This carbamic acid quickly decomposes by splitting off (releasing) carbon dioxide and leaving behind the amine 328. This amine 328 then reacts with another isocyanate group 326 to form the polyurea 330 linkage. A simplified summary is also shown to illustrated that the isocyanate 326 and water 334 produce a polyurea 330 linkage.

Referring to FIGS. 3C and 3D an illustrative chemical reaction process (Hydrolysis) for an exemplary polymerization initiator is depicted. FIG. 3C depicts a diagram 306 illustrating a first stage of the reaction and FIG. 3D depicts a diagram 308 illustrating a second stage of the reaction. In FIG. 3C, a polymer 352 (e.g., an alkoxy acrylic polymer, such as an alkoxy silane functional acrylic) includes a silicon atom bonded to acrylate and ethoxy groups (represented by chains) via oxygen atoms. As illustrated in FIG. 3C, the polymer 352 also includes an unsaturated acrylate group 362 (R1) bonded to the silicon atom which polymerizes under light and photo initiators, as described with reference to FIG. 3A. An ethoxy group 366 (illustrated by alkoxy functional group, OR aka R—O) reacts with water 334 ($H_2O$) to produce ethanol 368 (illustrated by alcohol functional group, R—OH) and a reacted polymer 354. The reacted polymer 354 now includes a hydroxy group 370 coupled to the silicon atom instead of the ethoxy group 366. The reacted polymer 354 may include a radical (R) 364 in place of the unsaturated acrylate group 362 (R1). As illustrated in FIG. 3C, the radical (R) 364 may be an ethyl radical such as $C_2H_5$.

The ethanol 368 released may provide an added benefit of an antiseptic. To illustrate, the released ethanol 368 may migrate to a tissue site (e.g., skin) and may kill virus or bacteria (reduce a count thereof) on the skin and/or reduce or prevent formation of virus or bacteria (reduce or slow a growth rate thereof). The ethanol 368 may be absorbed into tissue of the tissue site and/or evaporated from the tissue without harm to the tissue or the tissue site. Additionally or alternatively, the released ethanol 368 may kill virus or bacteria (reduce a count of thereof) on the DSA or a component attached thereto and/or reduce or prevent formation of virus or bacteria (reduce or slow a growth rate thereof).

Referring to FIG. 3D, two reacted polymers 354 join together, i.e., cross-link or undergo chain extension to form a longer chain polymer molecule 356. In FIG. 3D, the reacted polymers 354 release water 334 ($H_2O$) when joining together, and the longer chain polymer molecule 356 includes acrylate and ethoxy groups (represented by chains). The water 334 is released by joining of the hydroxy groups 370 of the reacted polymers 354 and may be used to continue the reaction, i.e., to produce another reacted polymer 354 as illustrated in FIG. 3C. Accordingly, the reactions may continue to increase cross-linking of the polymer molecules.

As illustrated in FIG. 3D, the reacted polymers 354 join together (condense) to form a crosslinked polymer, such as a crosslinked acrylic siloxane (i.e., a silicone) and release water. Although FIGS. 3C and 3D describe the polymers as including ethoxy groups, the polymers may include methoxy groups which react with water in other implementations.

In some implementations, the longer chain polymer molecules 356 (crosslinked polymers) include an unsaturated acrylate group 362 (R1) which polymerizes under light and photo initiators. In other implementations, the unsaturated acrylate group 362 (R1) was previously attached to the polymers (unreacted polymers 352) and was polymerized as described with reference to FIG. 3B.

In some implementations, the reactions illustrated in FIGS. 3C and 3D may utilize one or more catalysts (Z). For example, the reactions may be initiated or facilitated by one or more catalysts. As illustrated in FIGS. 3C and 3D, a first catalyst 372 is used to facilitate the reaction of the unreacted polymer 352 with water 334, and a second catalyst 374 is used to facilitate the reaction between reacted polymers 354. As illustrative, non-limiting examples, the first catalyst 372, the second catalyst 374, or both may include or correspond to Organotin (e.g., compounds of tin bonded to a carbon or hydrocarbon), titanates (e.g., titanium oxide) or a combination thereof.

Figure 4A:
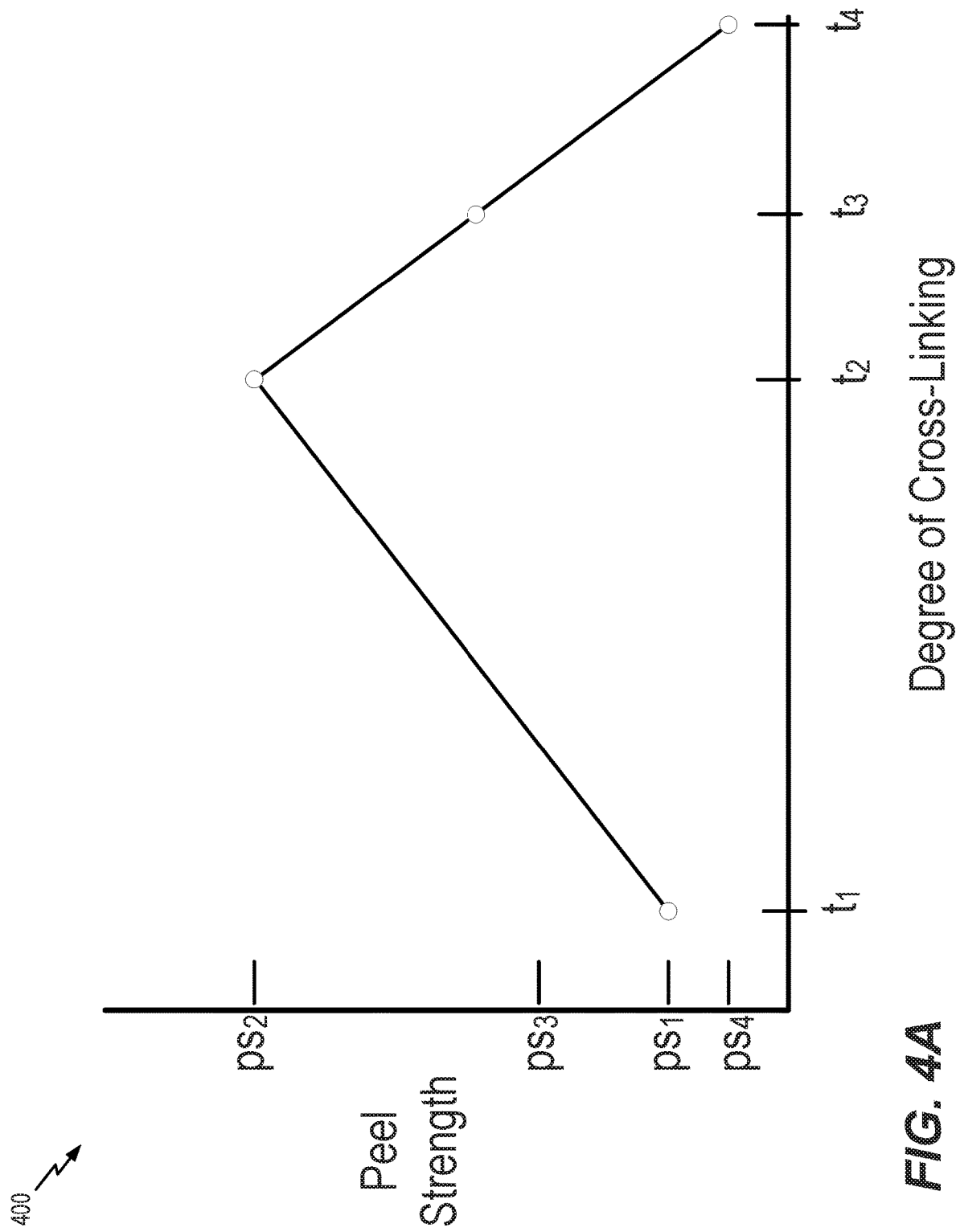
FIG. 4A is diagram illustrating peel strength of a dual switchable adhesive and a degree of cross-linking of the dual switchable adhesive.
Figure 4B:
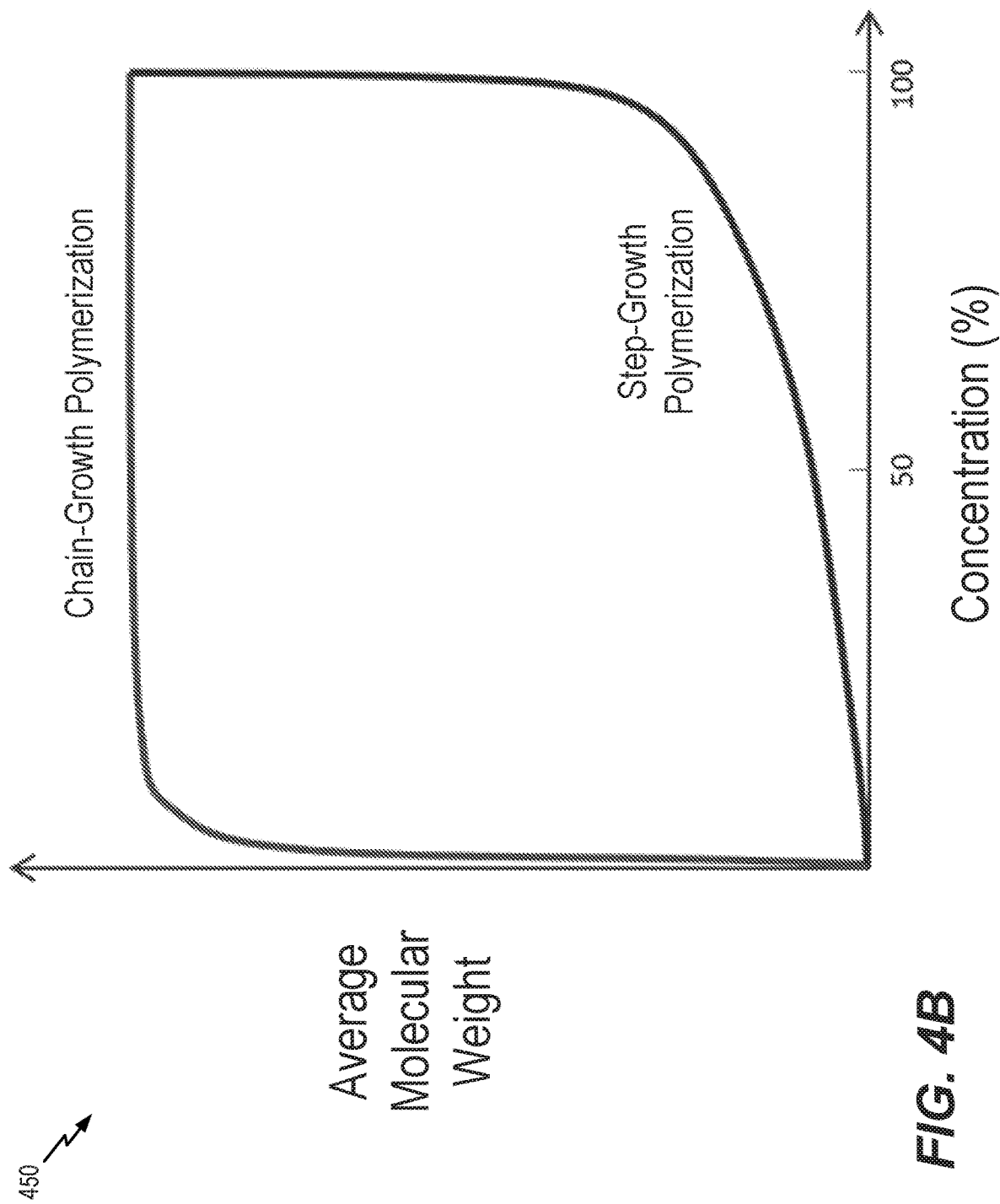
FIG. 4B is diagram illustrating chain-growth polymerization and step-growth polymerization with respect to concentration and molecular weight.

Referring to FIG. 4A, an exemplary graph 400 illustrating peel strength of an exemplary DSA and a degree of cross-linking of the DSA is shown. FIG. 4A illustrates a line graph illustrating peel strength values on a y-axis (vertical axis) and cross-linking values on an x-axis (horizontal axis) for transitions of a DSA, i.e., from a first state to a second state and from the second state to the third state. As an illustrative example, cross-linking values or a degree of cross-linking may include or correspond to an acrylate double bond conversion percentage. In FIG. 4A, four exemplary peel strengths (ps1-ps4) and cross-linking degrees are illustrated at four corresponding times (t1-t4).

At a first time, t1, the DSA is uncured or partially cured, is in the first state (e.g., first phase 142), and has a first peel strength, ps1. From t1 to t2, the DSA undergoes a transition from the first state to the second state responsive to receiving first light and/or moisture. At a second time, t2, the DSA is partially cured, is in the second state (e.g., second phase 144), and has a second peel strength, ps2. From t2 to t3, the DSA undergoes a transition from the second state to a third state responsive to receiving second light and/or moisture. At a third time, t3, the DSA is fully cured, is in the third state (e.g., third phase 146), and has a third peel strength, ps3.

Alternatively, the third state or fully cured state has a peel strength that is lower than the first peel strength. As illustrated in FIG. 4A, in some implementations the DSA can be cured to have a fourth peel strength in the third state, such as by adding additional light or moisture. The fourth peel strength, ps4, corresponds to a fourth time, t4.

Graph 400 is an exemplary graph and the slopes (i.e. rate of change) of peel strength to degree of cross-linking is illustrative. The example slopes shown in FIG. 4A may be different from actual implementations of DSA and may differ based on which type of initiator is used. To illustrate, light/photo initiators may induce more cross-linking more quickly than moisture/polymerization initiators and thus, for example, a slope from t1 to t2 may be less than a slope from t2 to t3 or t4, as illustrated. As another illustration, IR light may induce more cross-linking more quickly than UV or visible light and thus, for example, a slope from t1 to t2 may be greater than a slope from t2 to t3 or t4. Also, the example slopes are illustrated as linear or constant change, i.e., no acceleration or deceleration in the reaction for clarity. In actual examples, the slopes are likely to change (curves as opposed to lines) as the reactions are likely to slow when concentrations of reaction components decrease. Additionally, different formulations of DSA may have different slopes from each other. To illustrate, moisture/UV formulations have different slopes from moisture/IR formulations.

Referring to FIG. 4B, an exemplary graph 450 illustrating chain-growth polymerization and step-growth polymerization with respect to concentration and molecular weight is shown. FIG. 4B illustrates a line graphs that depicts the different polymerization processes for chain-growth and step-growth polymerization. As illustrated in FIG. 4B, as chain-growth polymerization occurs (increases in concentration), the existing polymers and chains link together and the average molecular rate rises faster as compared to step-growth polymerization. This is caused by initial or more rapid cross-linking as compared to step-growth polymerization. In step-growth polymerization, cross-linking usually occurs after chain-extension. To illustrate, bi-functional or multifunctional monomers react to form first dimers, then trimers, longer oligomers and eventually long chain polymers, which are crosslinked or then cross-link. Thus, the average molecular weight goes up more slowly in step-growth polymerization as compared to chain-growth polymerization.

FIGS. 5A-5D illustrates an example 500 of attaching and removing a compound film from a bond site, such as tissue 522. As illustrated in FIGS. 5A-5D, compound film 552 includes a first polymer layer 512, a second polymer layer 514, a DSA 596, and an adhesive cover film 598. Referring to FIGS. 5A and 5B, an example of attaching a compound film 552 to tissue 522 is shown. Compound film 552 may include or correspond to compound film 152. Layers 512, 514 may include or correspond to layers 192, 194, and DSA 596 may include or correspond to DSA 110. Tissue 522 may include or correspond to target tissue of a tissue site (e.g., 720) of a patient.

Although FIG. 5A illustrates that the compound film 552 includes adhesive cover film 598, the adhesive cover film 598 is optional and may not be included in some implementations. Adhesive cover film 598 (e.g., an adhesive cover layer) is positioned over or coupled to DSA 596 to protect DSA 596 from activation, i.e., receiving light and transitioning to between phases (e.g., 192-196), and from dust or contamination. Adhesive cover film 598 is configured to be removed prior to application of compound film 552 to tissue 522, and as such, adhesive cover film 598 has a lower peel strength or bond strength to the DSA 596 than a peel strength or bond strength between the DSA 596 and the second polymer layer 514 when the DSA 596 is in the first phase (e.g., 192). Adhesive cover film 598 may be formed of a thin, clear, flexible, breathable material with a high refractive index. One exemplary material for adhesive cover film 598 is polyurethane (PU).

FIG. 5A depicts a first state of compound film 552 prior to attachment to tissue 522 via DSA 596. FIG. 5B depicts a second state of compound film 552 after attachment of compound film 552 to tissue 522 via DSA 596. To attach compound film 552, the adhesive cover film 598 is removed from compound film 552 and the compound film 552 is attached to tissue 522. During attachment, compound film 552 may be repositioned, DSA 596 may be adjusted if unintended contact occurs, or a combination thereof. Additionally, DSA 596 may be worked into creases or surfaces of tissue 522 to create a strong, uniform bond. Once compound film 552 is in the desired position on tissue 522, moisture 134 (e.g., ambient or environmental moisture) may initiate curing/cross-linking and to transition the DSA 596 from the first phase (e.g., 142) to the second phase (e.g., 144). Additionally, or alternatively, moisture 534 may be applied to initiate curing/cross-linking and to transition the DSA 596 from the first phase (e.g., 142) to the second phase (e.g., 144).

As illustrated in FIG. 5B, moisture 134 from tissue site 522 is drawn into and penetrates the DSA 596 and the moisture 534 applied from moisture applicator 516, such as moisture source 114, penetrates both the first polymer layer 512 and the second polymer layer 514. For example, the first polymer layer 512 and the second polymer layer 514 are permeable to fluids, such as water. Additionally, or alternatively, moisture 134 from the air may migrate to DSA 596 by penetrating one or more of the first polymer layer 512 and the second polymer layer 514 to initiate curing/cross-linking and to transition the DSA 596 from the first phase (e.g., 142) to the second phase (e.g., 144). In FIG. 5B, a bond strength between the DSA 596 and tissue 522 increases responsive to the moisture 134 and/or moisture 534, as described with reference to FIG. 4A.

In other implementations, an additional polymer layer may be included to protect against a wavelength or wavelengths used to cure DSA 596 and transition DSA 596 from the first phase to the second phase. For example, when visible light is used to transition DSA 596 from the first phase to the second phase, a third polymer layer may be coupled to the first polymer layer 512 (i.e., opposite the second polymer layer 514), and the third polymer layer is removed after attaching the compound film 552 to tissue 522 via DSA 596 but prior to application of the moisture 134.

Referring to FIGS. 5C and 5D, an example of removing a compound film 552 from tissue 522 is shown. FIG. 5C depicts a third state of compound film 552 attached to tissue 522 via DSA 596. FIG. 5D depicts a fourth state of compound film 552 during removal of compound film 552.

Referring to FIG. 5C, the first polymer layer 512 is removed from the second polymer layer 514 by a patient or care provider, and second light 194 is applied to compound film 552 to initiate further curing/cross-linking and transition the DSA 596 from the second phase (e.g., 144) to the third phase (e.g., 146). In FIG. 5C, a bond strength between the DSA 596 and tissue 522 decreases responsive to the first light 132 (or the second light 136). Thus, a bond strength between the DSA 596 and tissue 522 in FIG. 5C after receiving first light 132 (or the second light 136) is less than the bond strength between the DSA 596 and tissue 522 in FIG. 5B (after receiving the first light 132).

Referring to FIG. 5D, the second polymer layer 514, and optionally the DSA 596, is/are removed from the tissue 522 by a patient or care provider. In FIG. 5D, because the peel strength between the DSA 596 and the tissue 522 is less than a peel strength between the DSA 596 and the second polymer layer 514, the second polymer layer 514 and the DSA 596 detach from tissue 522. Additionally, because of the reduced peel strength of the DSA 596 in the third phase, the DSA 596 (and second polymer layer 514) may be removed from the tissue 522 without damage and pain.

In some implementations, a peel strength between the first polymer layer 512 and the second polymer layer 514 is between a peel strength of the DSA in the first phase and a peel strength of the DSA in the second phase, such as 4 N/25 mm to 8 N/25 mm. In a particular implementation, a peel strength between the first polymer layer 512 and the second polymer layer 514 is between 6 N/25 mm to 8 N/25 mm. Additionally, or alternatively, a peel strength between the second polymer layer 514 and the DSA 596 is greater than 4 N/25 mm. To illustrate, when DSA 596 is applied or disposed on the second polymer layer 514, the DSA 596 forms a bond with the second polymer layer 514 having a peel strength is greater than 3 N/25 mm in the first phase. In a particular implementation, a peel strength between the second polymer layer 514 and the DSA 596 is greater than 8 N/25 mm.

In some implementations, the DSA 596 is configured to have a peel strength of less than 6 N/25 mm between the DSA 596 and a tissue 522 prior to being cured, i.e., in the first phase. In a particular implementation, the DSA 596 is configured to generate a peel strength of 2 N/25 mm to 6 N/25 mm or of less than 4 N/25 mm between the DSA 596 and a tissue 522 prior to being cured. Additionally, or alternatively, the DSA 596 is configured to form a bond between the DSA 596 and a tissue 522 having a peel strength of less than 6 N/25 mm.

In some implementations, the DSA 596 is configured to generate a peel strength of greater than 6 N/25 mm between the DSA 596 and a tissue 522 within 2 hours after curing of the DSA 596 attached to the tissue 522. The tack level of the DSA 596 causes the DSA 596 to form a stronger bond with tissue 522 after application. Such a tack level allows for repositioning of the DSA 596 before the DSA 596 generates its maximum or operational bond strength. Adhesive cover film 598 may protect DSA 596 from dust and/or debris and enable easier handling to ensure that DSA 596 forms its maximum or operating bond. In a particular implementation, the DSA 596 is configured to generate a peel strength of 6 N/25 mm to 8 N/25 mm or of greater than 8 N/25 mm between the DSA 596 and a tissue 522 within 2 hours after curing of the DSA 596 attached to the tissue 522. Additionally, or alternatively, the DSA 596 is configured to form a bond between the DSA 596 and a tissue 522 having a peel strength of greater than 6 N/25 mm.

In some implementations, compound film 552 includes a tab 544 to facilitate removal of first polymer layer 512 from the compound film 552 (e.g., second polymer layer 514 thereof). Additionally or alternatively, other features may be added to control or influence peel strength, facilitate separation of layers, and/or protection of DSA, i.e., activations of polymerization initiators thereof. Examples of such features include perforations in one or more layers of compound film 552, as described with reference to U.S. Prov. Pat. App. No. 62/816,351, which is incorporated by reference in its entirety herein. Another example feature includes patterns of DSA, such as described with reference to U.S. Prov. Pat. App. No. 62/816,351. Such features may be used alone or in combination with other features described herein.

Figure 6A:
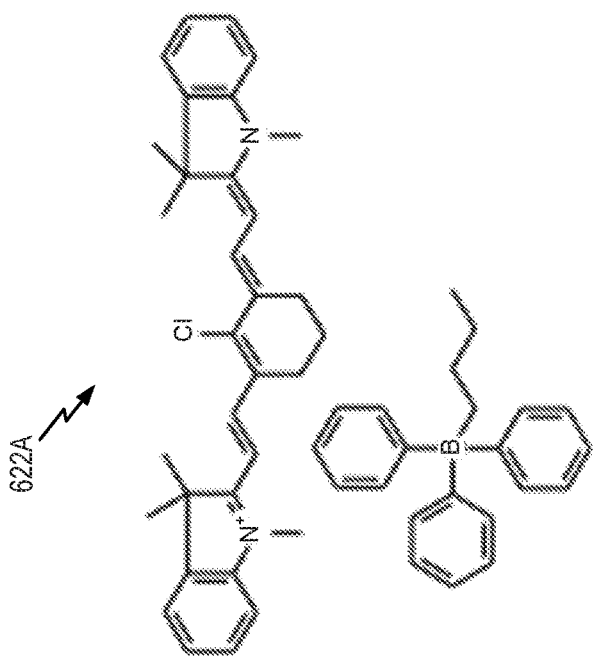
FIGS. 6A-6C are each a diagram illustrating a chemical formula of an example of a photo initiator of a dual switchable adhesive.
Figure 6B:
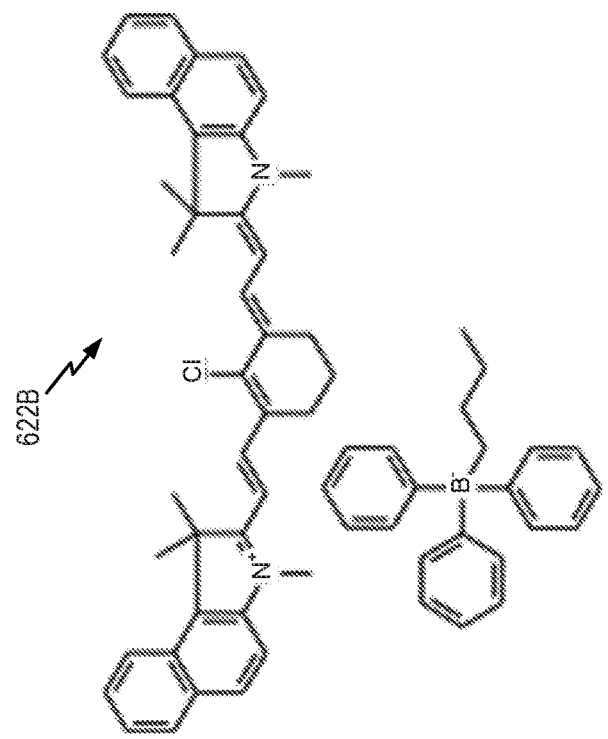
Figure 6C:
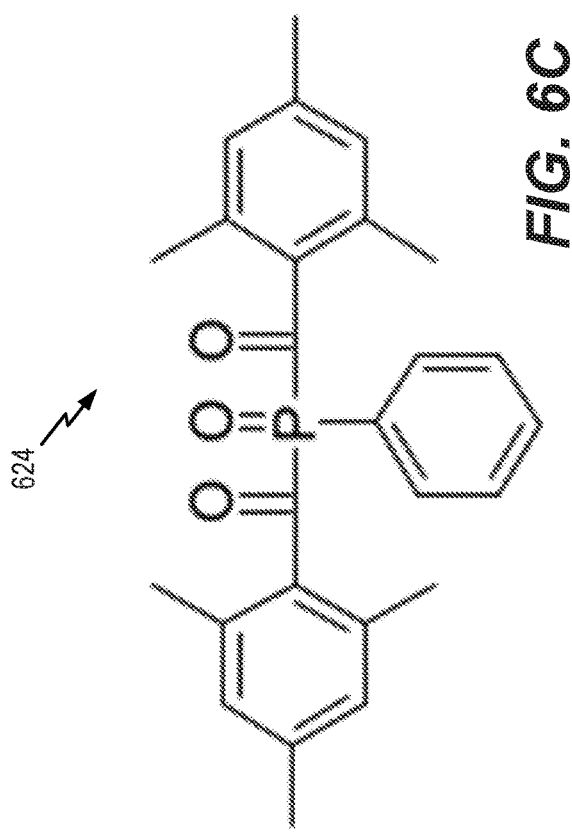

FIGS. 6A-6C each illustrate a chemical formula for an exemplary photo initiator of a DSA, such as DSA 110 or DSA 596. Referring to FIG. 6A, a first chemical formula of a first photo initiator 622A is depicted. The first photo initiator 622A includes or corresponds to H-Nu-IR 780. The first photo initiator 622A may include or correspond to the photo initiators 122.

Referring to FIG. 6B, a second chemical formula of a second photo initiator 622B is depicted. The second photo initiator second includes or corresponds to H-Nu-IR 815. The second photo initiator 622B may include or correspond to the photo initiators 122. Thus, the first and second photo initiators 622A, 622B may be referred to as first type photo initiators 622A, 622B, and may be activated by similar wavelengths.

Referring to FIG. 6C, a third chemical formula is illustrated for a third photo initiator 624. The third photo initiator 624 is or includes Bis(2,4,6, trimethylbenzoyl)-phenylphosphineoxide. In a particular example, the third photo initiator 624 has a molecular weight of 418.5 and correspond to Irgacure 819. The third photo initiator 624 may include or correspond to the photo initiators 122. The third photo initiator 624 may be referred to as a second type photo initiator and different from the first type photo initiators (e.g., 622A, 622B).

In some implementations, first type photo initiators 622A, 622B have a concentration (e.g., weight percentage) of 0.05 to 3 percent of the total weight of the DSA (polymer composition). In a particular implementation, the first type photo initiators 622A, 622B have a concentration (e.g., weight percentage) of 0.1 to 1 percent of the total weight of the DSA (polymer composition).

Additionally, or alternatively, the second type photo initiators 624 have a concentration (e.g., weight percentage) of 0.5 to 8 percent of the total weight of the DSA (polymer composition). In a particular implementation, the second type photo initiators 624 have a concentration (e.g., weight percentage) of 1 to 4 percent of the total weight of the DSA (polymer composition).

In such implementations where a co-initiator or co-initiators are used, a first co-initiator for the first type photo initiators 622A, 622B may have a concentration (e.g., weight percentage) of 0.05 to 6 percent of the total weight of the DSA (polymer composition). In a particular implementation, the first co-initiator has a concentration (e.g., weight percentage) of 0.1 to 1 percent of the total weight of the DSA (polymer composition). As an illustrative, non-limiting example, a Borate V (from Spectra Group Limited) co-initiator may have a 1:1 ratio (mass concentration) with the first photo initiators.

Additionally, or alternatively, a second co-initiator for the second type photo initiators 624 may have a concentration (e.g., weight percentage) of 0.05 to 3 percent of the total weight of the DSA (polymer composition). In a particular implementation, the second co-initiator has a concentration (e.g., weight percentage) of 0.1 to 1 percent of the total weight of the DSA (polymer composition). As an illustrative, non-limiting example, an Irgacure 184 co-initiator may have a ratio (mass concentration) of 1:1 to 1:4 with the second type photo initiators 624.

In some implementation, a solvent may be added to the DSA (polymer composition) increase solubility of a photo initiator, a co-initiator, or both. For example, the DSA (polymer composition) has 2 to 3 percent by weight of DMAA and/or ketones, individually or in total.

FIG. 7A shows a perspective view of an illustrative system 700 (e.g., a therapy system) for providing wound therapy. System 700 may include a dual switchable adhesive, such as DSA 110, a therapy device 710, a canister 712, a tube 714, a dressing 716, a light source 718 (e.g., a UV device or a dual light device), and a moisture applicator 719. As an illustrative example, system 700 includes DSA 110 as part of dressing 716 (e.g., drape 732 thereof). For example, DSA 110 is attached to a drape layer 794 of drape 732. The drape 732 includes a protective film 792 removably coupled to the drape layer 794 opposite the DSA 110, and the protective film 792 and drape layer 794 correspond to a compound film 752.

System 700 is configured to provide therapy (e.g., oxygen therapy, positive-pressure therapy, negative-pressure therapy, or a combination thereof) at a tissue site 720 associated with a target area of a patient. For example, dressing 716 may be in fluid communication with tissue site 720 and may be in fluid communication with therapy device 710 via tube 714. In some implementations, system 700 may include one or more components commercially available through and/or from KCI USA, Inc. of San Antonio, Tex., U.S.A., and/or its subsidiary and related companies (collectively, "KCI").

Therapy device 710 (e.g., a treatment apparatus) is configured to provide therapy to tissue site 720 via tube 714 and dressing 716. For example, therapy device 710 may include a pressure source (e.g., a negative-pressure source, such as a pump, or a positive-pressure source, such as a pressurized oxygen container, an oxygen concentrator, or an oxygen collector) configured to be actuatable (and/or actuated) to apply pressure differential relative to ambient conditions to dressing 716. As illustrative, non-limiting examples, positive-pressure applied to a tissue site may typically ranges between 5 millimeters mercury (mm Hg) (667 pascals (Pa)) and 30 mm Hg (4.00 kilo (k) Pa). Common therapeutic ranges are between 10 mm Hg (1.33 kPa) and 25 mm Hg (3.33 kPa). As illustrative, non-limiting examples, reduced-pressure applied to a tissue site may typically ranges between −5 millimeters mercury (mm Hg) (−667 pascals (Pa)) and −500 mm Hg (−66.7 kilo (k) Pa). Common therapeutic ranges are between −75 mm Hg (−9.9 kPa) and −300 mm Hg (−39.9 kPa).

In some implementations, therapy device 710 may alternate between providing positive-pressure therapy and negative-pressure therapy to the dressing 716, may provide positive-pressure therapy to a first portion of the dressing 716 and negative-pressure therapy to a second portion of the dressing 716, may provide no positive or negative pressure, or a combination thereof. In some such implementations, the therapy device 710 can provide positive-pressure therapy and negative-pressure therapy to the dressing 716 at the same time (e.g., partially concurrently).

As illustrated in FIG. 7A, therapy device 710 includes canister 712 to receive fluid from tissue site 720 or to provide fluid to tissue site 720. Although canister 712 is illustrated as being internal to and/or integrated with therapy device 710, in other implementations, canister 712 is external to therapy device 710, as illustrated and described with reference to FIG. 1A.

Therapy device 710 may also include one or more other components, such as a sensor, a processing unit (e.g., a processor), an alarm indicator, a memory, a database, software, a display device, a user interface, a regulator, and/or another component, that further facilitate positive-pressure therapy. Additionally, or alternatively, therapy device 710 may be configured to receive fluid, exudate, and or the like via dressing 716 and tube 714. Therapy device 710 may include one or connectors, such as a representative connector 738. Connector 730 is configured to be coupled to tube 714. Additionally, or alternatively, therapy device 710 may include one or more sensors, such a pressure sensor (e.g., a pressure transducer). The one or more sensors may be configured to enable therapy device 710 to monitor and/or sense a pressure associated with tube 714 and/or dressing 716.

Tube 714 includes one or more lumens (e.g., one or more through conduits), such as a single lumen conduit or multiple single-lumen conduits. Tube 714 (e.g., a least one of the one or more lumens) is configured to enable fluid communication between therapy device 710 and dressing 716. For example, fluid(s) and/or exudate can be communicated between therapy device 710 and dressing 716, and/or one or more pressure differentials (e.g., positive-pressure, negative pressure, or both) can be applied by therapy device 710 to dressing 716. As an illustrative, non-limiting illustration, tube 714 is configured to deliver at least pressurized oxygen from therapy device 710 to dressing 716 to establish positive-pressure. Communication of fluid(s) and application of a pressure differential can occur separately and/or concurrently.

In some implementations, tube 714 may include multiple lumens, such as a primary lumen (e.g., a positive-pressure/fluid lumen) for application of positive-pressure and/or communication of fluid, and one or more secondary lumens proximate to or around the primary lumen. The one or more secondary lumens (e.g., one or more ancillary/peripheral lumens) may be coupled to one or more sensors (of therapy device 710), coupled to one or more valves, as an illustrative, non-limiting example. Although tube 714 is described as a single tube, in other implementations, system 700 may include multiple tubes, such as multiple distinct tubes coupled to therapy device 710, dressing 716, or both.

As used herein, a "tube" broadly refers to a tube, pipe, hose, conduit, or other structure with one or more lumens adapted to convey fluid, exudate, and/or the like, between two ends. In some implementations, a tube may be an elongated, cylindrical structure with some flexibility; however, a tube is not limited to such a structure. Accordingly, tube may be understood to include a multiple geometries and rigidity. Tube 714 includes one or more lumens (e.g., one or more through conduits), such as a single lumen conduit or multiple single-lumen conduits. Tube 714 (e.g., a least one of the one or more lumens) is configured to enable fluid communication between therapy device 710 and dressing 716. For example, fluid(s) and/or exudate can be communicated between therapy device 710 and dressing 716, and/or one or more pressure differentials (e.g., positive-pressure, negative pressure, or both) can be applied by therapy device 710 to dressing 716. As an illustrative, non-limiting illustration, tube 714 is configured to deliver at least pressurized oxygen from therapy device 710 to dressing 716 to establish positive-pressure. Communication of fluid(s) and application of a pressure differential can occur separately and/or concurrently.

Dressing 716 includes a connector 730 (also referred to as a dressing connection pad or a pad), a drape 732, and a manifold 734 (also referred to as a distribution manifold or an insert). Drape 732 may be coupled to connector 730. To illustrate, drape 732 may be coupled to connector 730 via an adhesive, a separate adhesive drape over at least a portion of connector 730 and at least a portion of drape 732, or a combination thereof, as illustrative, non-limiting examples.

Drape 732 may be configured to couple dressing 716 at tissue site 720 and/or to provide a seal to create an enclosed space (e.g., an interior volume) corresponding to tissue site 720. For example, drape 732 may be configured to provide a fluid seal between two components and/or two environments, such as between a sealed therapeutic environment and a local ambient environment. To illustrate, when coupled to tissue site 720, drape 732 is configured to maintain a pressure differential (provided by a positive-pressure source or a negative-pressure source) at tissue site 720. Drape 732 may include a drape aperture that extends through drape 732 to enable fluid communication between device and target tissue. Drape 732 may be configured to be coupled to tissue site 720 via an adhesive, such as a medically acceptable, pressure-sensitive adhesive that extends about a periphery, a portion, or an entirety of drape 732. Additionally, or alternatively, drape 732 may be coupled to tissue site 720 via a double-sided drape tape, paste, hydrocolloid, hydrogel, and/or other sealing device or element, as illustrative, non-limiting examples.

Drape 732 may include an impermeable or semi-permeable, elastomeric material, as an illustrative, non-limiting example. In some implementations, drape 732 may be liquid/gas (e.g., moisture/vapor) impermeable or semi-permeable. Examples of elastomers may include, but are not limited to, natural rubbers, polyisoprene, styrene butadiene rubber, chloroprene rubber, polybutadiene, nitrile rubber, butyl rubber, ethylene propylene rubber, ethylene propylene diene monomer, chlorosulfonated polyethylene, polysulfide rubber, polyurethane (PU), EVA film, co-polyester, and silicones. In some implementations, drape 732 may include the "V.A.C.® Drape" commercially available from KCI. Additional, specific non-limiting examples of materials of drape 732 may include a silicone drape, 3M Tegaderm® drape, and a polyurethane (PU) drape such as one available from Avery Dennison Corporation of Pasadena, Calif. An additional, specific non-limiting example of a material of the drape 732 may include a 30 micrometers (µm) matt polyurethane film such as the Inspire™ 2317 manufactured by Exopack™ Advanced Coatings of Matthews, N.C.

Referring to FIG. 7B, drape 732 includes or comprises a compound film 752 coupled to tissue site 720 by DSA 110. The compound film 752 of drape 732 includes a protective film 792 and a drape layer 794. A layer or coating of DSA 110 is bonded to drape layer 794. Protective film 792 may include or correspond to first layer 192 or first polymer layer 412. Drape layer 794 may include or correspond to second layer 194 or second polymer layer 414. In some implementations, drape 732 includes DSA 110 on only a portion of the compound film 752, such as a portion of the compound film 752 about a periphery of the drape 732.

Referring to FIG. 7A, manifold 734 is configured to be positioned on and/or near tissue site 720, and may be secured at the tissue site 720, such as secured by drape 732. The term "manifold" as used herein generally refers to a substance or structure that may be provided to assist in applying a pressure differential (e.g., positive-pressure differential) to, delivering fluids to, or removing fluids and/or exudate from a tissue site and/or target tissue. The manifold typically includes a plurality of flow channels or pathways that distribute fluids provided to and removed from the tissue site. In an illustrative implementation, the flow channels or pathways are interconnected to improve distribution of fluids provided to or removed from the tissue site. Manifold 734 may be a biocompatible material that may be capable of being placed in contact with the tissue site and distributing positive and/or negative-pressure to the tissue site. Manifold 734 may include, without limitation, devices that have structural elements arranged to form flow channels, such as foam, cellular foam, open-cell foam, porous tissue collections, liquids, gels, and/or a foam that includes, or cures to include, flow channels, as illustrative, non-limiting examples. Additionally, or alternatively, manifold may include polyethylene, a polyolefin, a polyether, polyurethane, a co-polyester, a copolymer thereof, a combination thereof, or a blend thereof.

In some implementations, manifold 734 is porous and may be made from foam, gauze, felted mat, or other material suited to a particular biological application. In a particular implementation, manifold 734 may be a porous foam and may include a plurality of interconnected cells or pores that act as flow channels. The foam (e.g., foam material) may be either hydrophobic or hydrophilic. As an illustrative, non-limiting example, the porous foam may be a polyurethane, open-cell, reticulated foam such as GranuFoam® material manufactured by Kinetic Concepts, Incorporated of San Antonio, Tex.

In some implementations, manifold 734 is also used to distribute fluids such as medications, antibacterials, growth factors, and other solutions to the tissue site. Other layers may be included in or on manifold 734, such as absorptive materials, wicking materials, hydrophobic materials, and hydrophilic materials. In an implementation in which the manifold 734 includes a hydrophilic material, manifold 734 may be configured to wick fluid away from tissue site 720 and to distribute positive-pressure to tissue site 720. The wicking properties of manifold 734 may draw fluid away from the tissue site 720 by capillary flow or other wicking mechanisms. An illustrative, non-limiting example of a hydrophilic foam is a polyvinyl alcohol, open-cell foam such as V.A.C. WhiteFoam® dressing available from Kinetic Concepts, Inc. of San Antonio, Tex. Other hydrophilic foams may include those made from polyether and/or foams that have been treated or coated to provide hydrophilicity.

In some implementations, manifold 734 is constructed from bioresorbable materials that do not have to be removed from tissue site 720 following use of the system 700. Suitable bioresorbable materials may include, without limitation, a polymeric blend of polylactic acid (PLA) and polyglycolic acid (PGA). The polymeric blend may also include without limitation polycarbonates, polyfumarates, and capralactones. Manifold 734 may further serve as a scaffold for new cell-growth, or a scaffold material may be used in conjunction with manifold 734 to promote cell-growth. A scaffold may be a substance or structure used to enhance or promote the growth of cells or formation of tissue, such as a three-dimensional porous structure that provides a template for cell growth. Illustrative examples of scaffold materials include calcium phosphate, collagen, PLA/PGA, coral hydroxy apatites, carbonates, or processed allograft materials. Although a manifold 734 is illustrated in FIG. 7A, in other implementations, dressing 716 does not include manifold 734. In such implementations, drape 732 of dressing 716 is coupled to connector 730.

Connector 730 includes a body 742 (e.g., a housing) and a base 744, and is configured to be coupled to tube 714 via an interface 746 (e.g., a port). Base 744 is configured to be coupled to dressing 716. For example, base 744 may be coupled, such as via an adhesive, to drape 732 and/or manifold 734. In some implementations, base 744 comprises a flange that is coupled to an end of body 742 and/or is integrally formed with body 742. Connector 730, such as body 742, base 744, interface 746, or a combination thereof, may be made of rigid material and/or a semi-rigid material. In a non-limiting example, connector 730 may be made from a plasticized polyvinyl chloride (PVC), polyurethane, cyclic olefin copolymer elastomer, thermoplastic elastomer, poly acrylic, silicone polymer, or polyether block amide copolymer. In some implementations, connector 730 is formed of a semi-rigid material that is configured to expand when under a force, such as positive-pressure greater than or equal to a particular amount of pressure. Additionally or alternatively, connector 730 may be formed of a semi-rigid material that is configured to collapse when under a force, such as reduced-pressure less than or equal to a threshold pressure.

Body 742 includes one or more channels or one or more conduits that extend from and/or are coupled to interface 746. To illustrate, body 742 may include a primary channel configured to be coupled in fluid communication with a primary lumen (e.g., 721) of tube 714. The primary channel may be coupled to a cavity (e.g., a tissue cavity partially defined by body 742) having an aperture open towards manifold 734 (and/or towards tissue site 720). For example, the primary channel may include a first opening associated with interface 746 and a second opening (distinct from the aperture of the cavity) associated with the cavity. Thus, the primary channel may define a through channel of body 742 to enable fluid communication between interface 746 and tissue site 720.

Body 742 includes a channel (e.g., a through channel) having a first aperture open opposite dressing 716 and a second aperture open towards dressing 716. For example, the first aperture is located on an outer surface side (e.g., an ambient environment surface) of connector 730 and the second aperture is located on an inner surface side (e.g., a tissue facing side) of connector 730. The second aperture is configured to be coupled to one or more lumens of tube 714, such as coupled via the cavity. Illustrative, non-limiting examples of commercially available connectors include a "V.A.C. T.R.A.C.® Pad," or "Sensa T.R.A.C.® Pad" available from Kinetic Concepts, Inc. (KCI) of San Antonio, Tex.

In some implementations, dressing 716 further includes a bandage and/or a wound closure device 760. For example, a bandage may be placed over a wound to protect the wound and a wound closure device 760 may be placed proximate to a wound to provide a force to maintain tissue in fixed position to promote wound closure. Each of the bandage and/or a wound closure device 760 may include compound film 752.

Light source 718 is configured to provide light to activate DSA 110 (e.g., one or more type of photo initiators thereof) and cause DSA 110 to switch phases or states. Light source 718 may include or correspond to the Sun, ambient lighting, a dedicated light device, such as an IR torch, an UV torch device, visible light torch, a dual light torch, or a combination thereof. In a particular implementation, light source 718 is included in or integrated with therapy device 710. In some such implementations, light source 718 provides light to drape 732 via tube 714.

Moisture applicator 719 is configured to provide moisture (e.g., 134, 534) to activate DSA 110 (e.g., one or more type of polymerization initiators thereof) and cause DSA 110 to switch phases or states. Moisture applicator 719 may include or correspond to a dedicated moisture application device, such as a wipe, a spray bottle, or a combination thereof. In a particular implementation, moisture applicator 719 is included in or integrated with therapy device 710. In some such implementations, moisture applicator 719 moisture to drape 732 via tube 714.

During operation of system 700, dressing 716 is coupled to tissue site 720 over a wound. Additionally, dressing 716 is coupled to device 710 via tube 714. In some implementations, prior to coupling the dressing 716 to the tissue site 720, a bandage or a wound closure device 760 is coupled to tissue site 720 proximate to a wound. The dressing 716 is then coupled over the bandage or wound closure device 760. One or more of the dressing 716 or over the bandage or wound closure device 760 is coupled to tissue site 720 site via compound film 752. To illustrate, DSA 110 of the compound film 752 bonds the dressing 716, the bandage or wound closure device 760, or both to the tissue site 720 responsive to pressure. In a particular implementation when the compound film 752 is included in or corresponds to drape 732, and the compound film 752 may seal a portion of tissue site 720, such as an interior volume of dressing 716. Moisture (e.g., 134) is applied to the DSA 110 to partially cure the DSA 110 and transition the DSA 110 from a first phase (e.g., 142) to a second phase (e.g., 144), such as from a low tact/peel strength state to a high tact/peel strength state.

A pressure differential, such as positive-pressure, can be generated and/or applied to dressing 716 (e.g., the interior volume of dressing 716) by a pressure source associated with device 710. When positive-pressure is generated and/or applied to dressing 716, fluid or medication from device 710, such as from canister 712, may be transported to dressing 716. Furthermore, in some implementations, reduced-pressure can be applied to dressing 716 (e.g., the interior volume of dressing 716 or a second interior volume of the dressing 716) by a reduced-pressure source associated with device 710. When reduced-pressure is applied to dressing 716 (e.g., when vacuum pressure is generated, fluid, exudate, or other material within dressing 716 may be transported to canister 712 of device 710.

After operation, such as completion of therapy, system 700 may be disconnected and components thereof removed from tissue site 720. For example, protective film 792 of compound film 752 may be removed from drape layer 794 exposing DSA 110 thereof to light, such as ambient light or light (e.g., 132 and/or 136) from a dedicated light device (e.g., 112 or 114). The DSA 110 disposed on drape layer 794 may transition from the second phase (e.g., 144) to the third phase (e.g., 146). To illustrate, the DSA 110 transitions from the high tack/peel strength phase to a second low tack/peel strength phase by curing further (further increasing in cross-linking). Accordingly, drape 732, and thus dressing 716, can be easily removed from tissue site 720. In some implementations where a bandage/wound closure device 760 is used and where the bandage/wound closure device 760 includes a compound film 752, the DSA 110 can be activated by second light (e.g., 134 or 136), such as UV light. To illustrate, the protective film 792 of the compound film 752 of the bandage/wound closure device 760 may be removed from drape layer 794 exposing DSA 110 to the second light. Similarly, the bandage/wound closure device 760 can be easily removed from tissue site 720.

Thus, dressing 716, bandage/wound closure device 760, or both, can be adhered to a patient with a dual switchable adhesive in a low tack phase to be painlessly and easily repositioned. Accordingly, the dual switchable adhesive enables easier use and less waste, as compared to conventional light switchable adhesives with two phases or states.

Figure 8:
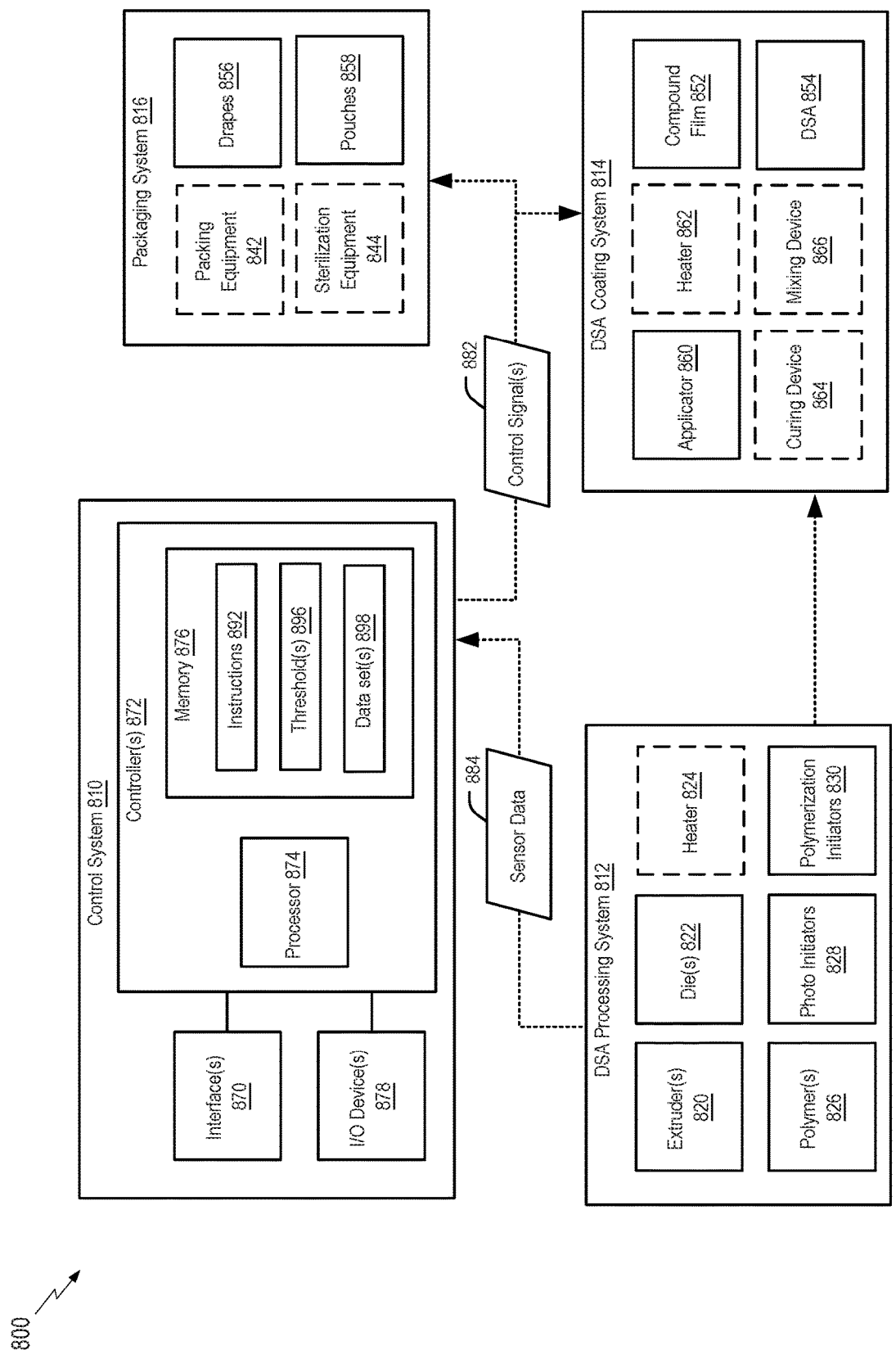
FIG. 8 is a block diagram of a manufacturing system for manufacturing a dual switchable adhesive and coating objects with the dual switchable adhesive.

Referring to FIG. 8, a block diagram of a manufacturing system, system 800, for making DSA and components (e.g., compound films) including DSA, such as a coating thereof. In the example illustrated in FIG. 8, system 800 includes a control system 810, a DSA processing system 812, a DSA coating system 814, and packaging system 816. Control system 810 is configured to control one or more of systems 812-816, as described further herein.

DSA processing system 812 includes one or more extruders 820, one or more dies 822, and optionally includes one or more heaters 824 (e.g., heating devices). DSA processing system 812 may include or correspond to melt blend extruder. DSA processing system 812 is configured to generate DSA 854 from one or more polymers 826, photo initiators 828, and polymerization initiators 830. For example, DSA processing system 812 may be configured to generate DSA 854, such as three phase DSA. DSA processing system 812 may include or correspond to an extrusion film system. For example, DSA processing system 812 receives or generates pellets or resin of one or more polymers 826 or receives a polymer composition (e.g., polymer composite) including one or more polymers 826, and DSA processing system 812 produces extrudate of a polymer material based on the received polymer material. The extrudate may have the form of or may be formed into a film of polymer material (i.e., a polymer film of a polymer composition). The extrudate may correspond to DSA 854 or may be post processed into DSA 854. As an illustrative example, DSA processing system 812 may include or correspond to a melt-compounding system or a melt-blend combiner.

DSA coating system 814 is configured to apply DSA 854 to or form a coating of DSA on a film, such as a compound film 852. For example, DSA coating system 814 is configured to apply or selectively apply DSA 854 to compound film 852. DSA coating system 814 includes an applicator 860 and DSA 854. Applicator 860 may be configured to apply the DSA 854 to compound film 852 in a pattern, i.e., apply a pattern of DSA 854. For example, applicator 860 selectively applies the DSA 854 according to patterns, as described with reference to FIGS. 5A-5D, or applicator 860 applied a coating of DSA 854 and a removal device (e.g., a blade, a scraper, a wiper, a roller, etc.) selectively removes a portion of the coating. In some implementations, the applicator 860 is a die (e.g., a slot die), a roller, a patterned roller, a spray nozzle, etc.

DSA coating system 814 may optionally include one or more heaters 862, curing devices 864, mixing devices 866, or a combination thereof. The one or more heaters 862 and mixing devices 866 may be configured to heat and mix DSA 854 prior to application and/or delivery to applicator 860. The one or more curing device 864 may be configured to apply heat or light to the DSA 854 after application by the applicator 860. The compound film 852 may include or correspond to compound film 152, compound film 552, or compound film 752, and may be received from a film generation/lamination system. In a particular implementation, and as illustrated in FIG. 8, the compound film 852 is formed into or included into a drape 856, such as drape 732.

Packaging system 816 includes packing equipment 842 and is configured receive drapes 856 and package the drapes 856 for shipping and storage. For example, packaging system 816 is configured to insert one or more drapes 856 into a pouch 858. In some implementation, packaging system 816 is further configured to insert or package one or more pouches 858 into a container or pallet. An illustrative example of a pouch is illustrated and described with reference to FIG. 10.

Packaging system 816 may optionally include sterilization equipment 844, and in such implementations, packaging system 816 is configure to further sterilize the drapes 856. The sterilization equipment 844 may be configured to apply a non-activating sterilizer (with respect to the DSA 854) or sterilization agent to the drapes 856 to sterilizes the drapes. The drapes 856 may be sterilized while in the pouches 858. As an illustrative, non-limiting example, the pouches 858 are permeable to the sterilizing agent and the sterilizing agent does not activate the DSA 854 of the drapes 856. In a particular implementation, the sterilization agent includes ethylene oxide. The ethylene oxide, or other sterilization agent, may be "dry" as in not mixed with water and/or used in conjunction with steam. The ethylene oxide may be provided to the pouches in a gaseous state. Conventional sterilization processes often use steam (i.e., water vapor) to open pores of the pouches 858 and/or drape 856 for penetration by the ethylene oxide. However, conventional sterilization processes which use water vapor cannot be used to sterilize the drapes 856 as it would activate the DSA 854.

Although listed as separate systems, systems 812-816 may be incorporated into a single system. For example, DSA processing system 812 and DSA coating system 814 may be incorporated into a single system. Additionally, system 800 may include one or more other systems, such as a film or compound film generation system, a cover film lamination system, a post-processing system, a drape formation system, a sterilization system, or a combination thereof. The post-processing system may be configured to cut and/or form the compound film 852 into shapes and add features to the compound film 852. For example, the post-processing system may modify the compound film to add tabs (e.g., 544).

Control system 810 includes one or more interfaces 870, one or more controllers, such as a representative controller 872, and one or more input/output (I/O) devices 878. Interfaces 870 may include a network interface and/or a device interface configured to be communicatively coupled to one or more other devices, such as DSA processing system 812 or DSA coating system 814. For example, interfaces 870 may include a transmitter, a receiver, or a combination thereof (e.g., a transceiver), and may enable wired communication, wireless communication, or a combination thereof. Although control system 810 is described as a single electronic device, in other implementations system 800 includes multiple electronic devices. In such implementations, such as a distributed control system, the multiple electronic devices each control a sub-system of system 800, such as DSA processing system 812, DSA coating system 814, or packaging system 816.

The one or more controllers (e.g., controller 872) includes one or more processors and one or more memories, such as representative processor 874 and memory 876. The one or more controllers may include or correspond to a DSA processing controller, a DSA application controller, a packaging controller, or a combination thereof. For example, DSA processing controller (e.g., processor 874) may be configured to generate and/or communicate one or more control signals 882 to DSA processing system 812. DSA processing controller may be configured to control (or regulate) an environment, such as an air quality, temperature, and/or pressure, within DSA processing system 812 (e.g., an extruder thereof) and/or delivery/injection of materials into DSA processing system 812. For example, DSA processing controller may be configured to generate and/or communicate one or more control signals 882, such as environment control signals, ingredient delivery control signals, or a combination thereof, to DSA processing system 812.

DSA application controller may be configured to control (or regulate) an environment, such as a temperature (e.g., heat) and/or pressure of DSA 854, applicator 860, or both, within DSA coating system 814 (e.g., applicator 860 thereof) and/or delivery/injection of DSA 854 into DSA coating system 814 (e.g., applicator 860 thereof). For example, application controller may be configured to generate and/or communicate one or more control signals 882, such as environment control signals, ingredient delivery control signals, or a combination thereof, to DSA coating system 814.

Packaging controller may be configured to control (or regulate) an environment, such as a temperature (e.g., heat) and/or pressure of DSA 854, applicator 860, or both, within packaging system 814 (e.g., packing equipment 842 and/or sterilization equipment 844 thereof). For example, packaging controller may be configured to generate and/or communicate one or more control signals 882, such as environment control signals, ingredient delivery control signals, or a combination thereof, to packaging system 816.

Memory 876, such as a non-transitory computer-readable storage medium, may include volatile memory devices (e.g., random access memory (RAM) devices), nonvolatile memory devices (e.g., read-only memory (ROM) devices, programmable read-only memory, and flash memory), or both. Memory 876 may be configured to store instructions 892, one or more thresholds 896, and one or more data sets 898. Instructions 892 (e.g., control logic) may be configured to, when executed by the one or more processors 874, cause the processor(s) 874 to perform operations as described further here. For example, the one or more processors 874 may perform operations as described with reference to FIGS. 1A, 1B, 5A-5D, 7, 8, and 10. The one or more thresholds 896 and one or more data sets 898 may be configured to cause the processor(s) 874 to generate control signals. For example, the processors 874 may generate and send control signals responsive to receiving sensor data from one or more of systems 812-816, such as exemplary sensor data 884 from DSA coating system 814. The temperature or ingredient flow rate can be adjusted based on comparing sensor data to one or more thresholds 896, one or more data sets 898, or a combination thereof.

In some implementations, processor 874 may include or correspond to a microcontroller/microprocessor, a central processing unit (CPU), a field-programmable gate array (FPGA) device, an application-specific integrated circuits (ASIC), another hardware device, a firmware device, or any combination thereof. Processor 874 may be configured to execute instructions 892 to initiate or perform one or more operations described with reference to FIG. 1A, FIG. 2, and/or one more operations of the methods of FIGS. 11, 13, 14, and 15.

The one or more I/O devices 878 may include a mouse, a keyboard, a display device, the camera, other I/O devices, or a combination thereof. In some implementations, the processor(s) 874 generate and send control signals responsive to receiving one or more user inputs via the one or more I/O devices 878.

Control system 810 may include or correspond to an electronic device such as a communications device, a mobile phone, a cellular phone, a satellite phone, a computer, a tablet, a portable computer, a display device, a media player, or a desktop computer. Additionally, or alternatively, the control system 810 may include a personal digital assistant (PDA), a monitor, a computer monitor, a television, any other device that includes a processor or that stores or retrieves data or computer instructions, or a combination thereof.

During operation of system 800, DSA processing system 812 generates DSA 854. For example, DSA processing system 812 generates DSA 854 by mixing one polymer(s) 826, photo initiators 828, and polymerization initiators 830. To illustrate, controller 872 may send one or more control signals 882 to DSA processing system 812. The control signals 882 may include signals configured to cause DSA processing system 812 to mix or blend polymer(s) 826 (e.g., resin or pellets thereof), and initiators 828, 830 to form a polymer composition or blend in extruder 820. To illustrate, control system 810 may send one or more signals 882 (e.g., environment control signals) to DSA processing system 812 to adjust conditions (e.g., heat, pressure, air quality) of the DSA processing system 812 or conditions (e.g., viscosity, temperature, etc.) of the polymer composition. Additionally or alternatively, control system 810 may send one or more control signals 882 (e.g., ingredient delivery control signals) to DSA processing system 812 to adjust rates and or amounts of polymer(s) 826, initiators 828, 830, one or more additives (e.g., 126), or a combination thereof.

In some implementations, heater 824 provides heat to extruder 820 or to polymer(s) 826 prior to delivery to the extruder 820. The polymer composition or blend is extruded by extruder 820 via a die 822 to form extrudate. The extrudate may include or correspond to the DSA 854.

After formation of DSA 854, the DSA 854 is provided to DSA coating system 814 and DSA coating system 814 applies or forms a coating of DSA 854 on the compound film 852. For example, DSA coating system 814 may form a coating or film of DSA 854 on the compound film 852 via selective application. To illustrate, control system 810 may send or more control signals to control delivery (e.g., application) of DSA 854 to applicator 860 of DSA coating system 814, DSA 854 to compound film 852 via applicator 860, or both. In other implementations, DSA coating system 814 forms the DSA 854 on the compound film 852 via selective removal. To illustrate, control system 810 may send or more control signals to control removal (e.g., scraping or removing) of DSA 854 from compound film 852.

In some implementations, DSA coating system 814 may receive control signals 882 to control a heater 862 and/or a mixing device 866 to heat and/or mix the DSA 854 prior to delivery of DSA 854 to applicator 860. Additionally, DSA coating system 814 may receive control signals 882 to control a curing device 864 to cure the DSA 854 applied to the compound film 852.

After formation of application of DSA 854 to the compound film 852, the compound film 852 may correspond to a drape 856 or may be further processed into a drape 856. After formation of multiple drapes 856, the drapes 856 may be packaged for shipping and/or storage by packaging system 816. For example, packaging system 816 may receive a plurality of pouches 858 and may open the pouches 858 and insert one or more drapes 856 into the pouches 858. The packaging system 816 may close and seal the pouches 858 after insertion of the one or more drapes 856. In some implementations, the packaging system 816 further sterilizes the pouches 858. In a particular implementation, the packaging system 816 sterilizes the drapes 856 while the drapes 856 are sealed in the pouches 858. To illustrates, the packaging system 816 applies a sterilizing agent, such as "dry" gaseous ethylene oxide, to the pouches 858. The ethylene oxides permeates through the pouch and sterilizes the drapes 856. As the drapes 856 are sealed in the pouch, the drapes 856 remain sterilized until the pouch 858 is opened prior to use.

In other implementations, the pouch 858 includes a valve, window, or flap and the packaging system 816 sterilizes the one or more drapes 856 in the pouch 858 via the valve, window, or flap, and then seals (e.g., fully seals or seals and unsealed portion of the pouch 858) the drapes 856 within the pouch 858.

In some implementations, packaging system 816 may receive control signals 882 to control the packing equipment 842 and/or the sterilization equipment 844. For example, the control signals 882 may activate a heater of the packing equipment 842 to seal one or more pouches 858. As another example, the control signals 882 may activate a pump of the sterilization equipment 844 to generate vacuum pressure within a chamber that includes the sealed pouches 858 and a valve of the sterilization equipment 844 to provide the sterilizing agent to the pouches 858.

Thus, system 800 of FIG. 8 produces dual switchable adhesives with three or more states or phases. Accordingly, the present disclosure enables manufacturing of a three or more phase dual switchable adhesives and inclusion of such dual switchable adhesives into products.

Figure 9:
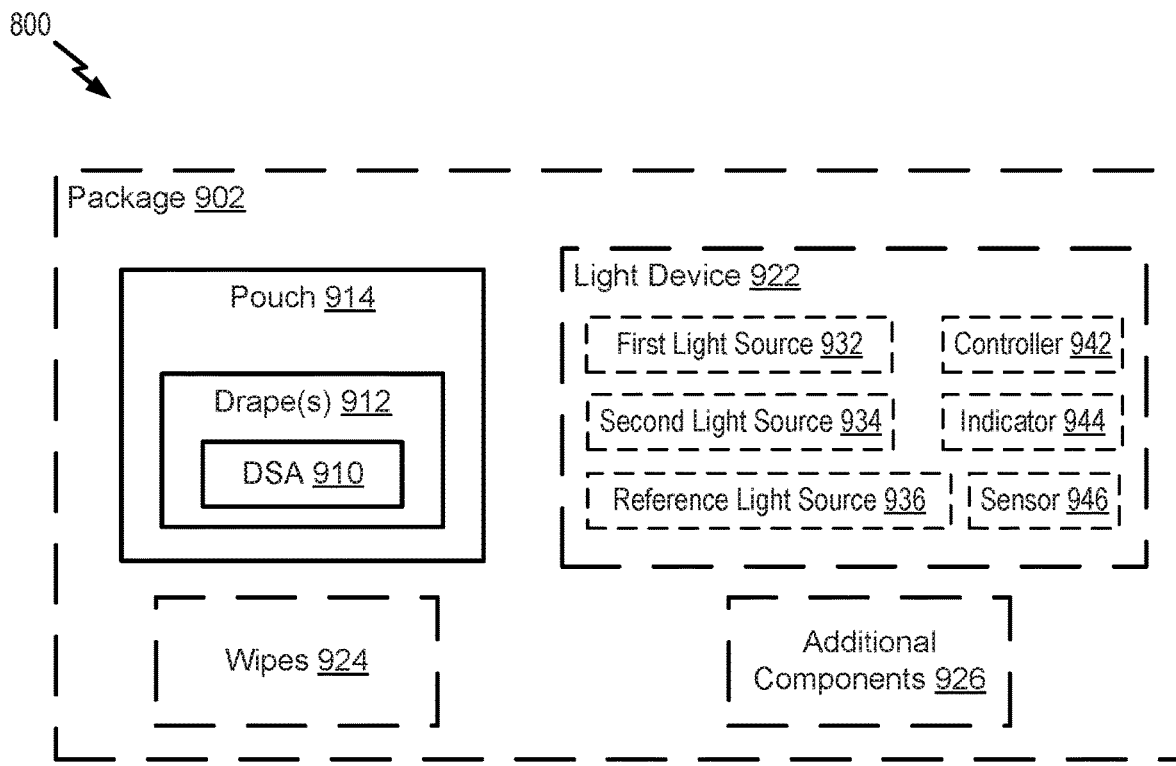
FIG. 9 is a block diagram of an example of a kit for dual switchable adhesives.

Referring to FIG. 9, a kit 900 for medical devices, such as a component of system 700, is illustrated. Kit 900 includes DSA 910. The DSA 910 may include or correspond to DSA 110, DSA 596, or DSA 854.

In some implementations, DSA 910 is included in or on a compound film, such as compound film 150, compound film 552, a drape 732, compound film 752, compound film 852, etc. As illustrated in FIG. 9, DSA 910 is includes in a drape 912. In some such implementations, one or more drapes 912 are included in a pouch 914, described further with reference to FIG. 10. Additionally, or alternatively, DSA 910 is included in a container (e.g., a tube of DSA) and kit 900 includes a DSA applicator.

In some implementations, kit 900 includes a light device 922. The light device 922 may include or correspond to light device 112, light source 116, light source 718, or a combination thereof. In a particular implementation, the light device 922 (i.e., a dual light device) includes a first light source 932 and a second light source 934. The first light source 932 is configured to emit first light (e.g., 132) to activate first photo initiators (e.g., 122) of DSA 910, and the second light source 934 is configured to emit second light (e.g., 136) to activate second photo initiators (e.g., 624) of DSA 910. For example, the first light source 932 may include or correspond to light device 112, and the second light source may include or correspond to light source 116.

In some implementations, the light device 922 further includes a reference light source 936 configured to emit reference light. The reference light source 936 may provide an indication of one or more distances. For example, the reference light source 936 may produce a particular shape or object (e.g., be in focus) with the reference light when the reference light source 936 is at a particular distance that corresponds to providing a particular light from one of the light sources 932, 934. As an illustrative example, the reference light source 936 includes two white light sources angled relative to one another such that the reference light emitted from each white light source converges at a particular distance. Accordingly, an operator of the light device 922 can determine a distance for application of first light, second light or both.

In a particular implementation, the light device 922 further includes a controller 942, an indicator 944, and a sensor 946 (e.g., light or distance sensor). The controller 942 is configured to receive sensor data from the sensor 946 and to provide an indication via the indicator 944 that indicates a distance between the light device 922 and a surface. The indication may be visual, auditory, or haptic based, and the indication may indicate a particular distance (e.g., show an actual distance) or may indicate when the determined distance is within a range of distance.

In some implementations, kit 900 further includes a moisture source or applicator (e.g., 134, 516, 719). As illustrated in FIG. 9, the kit 900 includes a wipe 924. Wipe 924 includes moisture and is configured to apply or transfer the moisture to the DSA 910 when in proximity to and/or when in contact with the DSA 910.

Additionally, or alternatively, kit 900 further includes a light source (e.g., a second light device), one or more additional components 926, or a combination thereof. The light source may include or correspond to a light source 116 or light source 718. The one or more additional components 926 may include or correspond to a DSA applicator, gloves, antiseptic, medical adhesive, and/or other components.

In some implementations, kit 900 may include a package 902. For example, package 902 may include a box, a bag, a container, or the like. Package 902 may include the DSA 910 and/or the light device 922. In some implementations, package 902 may further include the light source, the one or more additional components 926, or a combination thereof. Additionally, or alternatively, package 902 may include a packaging medium (e.g., packaging material), such as foam, paper, or the like. Thus, FIG. 9 describes kit 900 for a medical device that is secured to a tissue site or together by DSA (e.g., three phase DSA).

Figure 10:
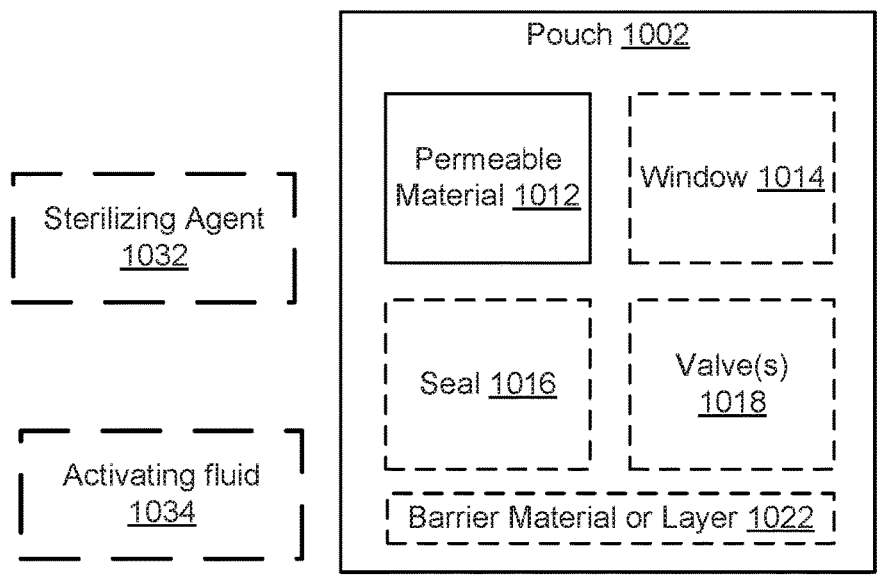
FIG. 10 is a block diagram of an example of a pouch for dual switchable adhesives.

Referring to FIG. 10, an example of a pouch 1002, such a pouch 858 or 914, configured to store drapes having moisture activated DSA (e.g., 110, 596, etc.) is illustrated. In FIG. 10, pouch 1002 includes a permeable material 1012 that is permeable to sterilizing agents 1032, such as sterilizing gasses, such a non-water based or "dry" gasses (e.g., ethylene oxide). The permeable material 1012 may also be configured to be a moisture barrier from moisture, such as activating fluid 1034, that would otherwise activate the DSA (such as polymerization initiators thereof).

In other implementations, the pouch 1002 includes a window or flap 1014 which can be opened or accessed to insert and/or remove a drape, to apply or remove sterilizing agents 1032, or both. In a particular implementation, a portion or a section of the pouch 1002 includes the permeable material 1012. This section, i.e., window or flap 1014, can then be covered or removed to seal the pouch 1002. In some implementations, the pouch 1002 includes one or more seals 1016. For example, the pouch 1002 may include one or more adhesive seals on the window or flap. As another example, the pouch 1002 may include excess permeable material 1012 which may be sealed by application of heat, vibration, chemical, etc.

In some implementations, the pouch 1002 includes one or more valves 1018. The one or more valves 1018 may be configured to release pressure, receive pressure, or both. To illustrate, the one or more valves 1018 may be configured to release fluid or air to relieve extra pressure (i.e., pressure above ambient pressure) that accumulates in the pouch 1002, to receive more fluid or air to increase pressure within the pouch 1002, or both. The one or more valves 1018 may include one way valves, or bi-directional valves, and the one or more valves 1018 may be configured to switch between open and closed based on a pressure within the pouch 1002, ambient pressure, or both. In some such implementations, the one or more valves 1018 include filters, such as antimicrobial filters configured to reduce or prevent microorganisms (e.g., bacteria and/or viruses) from entering the pouch 1002.

In some implementations, the permeable material 1012 is also configured to block or filter light, such as light that would otherwise activate the DSA of a drape to be inserted into the pouch 1002. Alternatively, an optional moisture barrier layer or material 1022 is configured to block or filter the light. In other implementations, the packaging (e.g., 902, such as a cardboard box) for the pouch 1002 is configured to block light that would otherwise activate the DSA of the drape in the pouch 1002.

Figure 11:
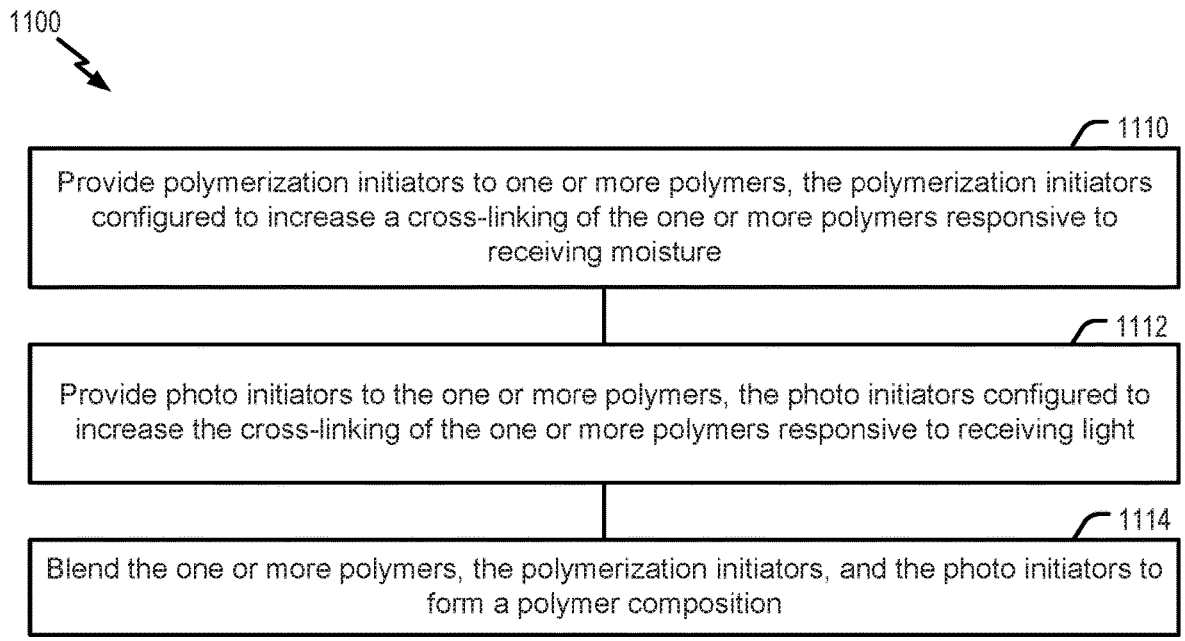
FIG. 11 is a flowchart illustrating an example of a method of manufacturing dual switchable adhesive.

FIG. 11 illustrates a method 1100 of manufacturing dual switchable adhesive. The method 1100 may be performed at or by system 800 (e.g., one or more of systems 812-816 thereof). Method 1100 includes providing polymerization initiators to one or more polymers, the polymerization initiators configured to increase a cross-linking of the one or more polymers responsive to receiving moisture, at 1110. For example, the polymerization initiators may include or correspond to polymerization initiators 124 or polymerization initiators 830, and the one or more polymers may include or correspond to one or more polymers 120. The moisture may include or correspond to moisture 134 or moisture 534.

Method 1100 also includes providing photo initiators to the one or more polymers, the photo initiators configured to increase the cross-linking of the one or more polymers responsive to receiving light, at 1112. For example, the photo initiators may include or correspond to photo initiators 122, 622A, or 622B or second photo initiators 624, and the light may include or correspond to first light 132 or second light 136.

Method 1100 further includes blending the one or more polymers, the polymerization initiators, and the photo initiators to form a polymer composition, at 1114. For example, the polymer composition may include or correspond to a dual switchable adhesive, such as DSA 110, DSA 854, or DSA 910. To illustrate, a melt-blend combiner (e.g., an extruder or extrusion system), melt blends the ingredients 120-124 together to form a polymer composition that corresponds to DSA.

In some implementations, method 1100 further comprises blending one or more additives to form the polymer composition. For example, the additives may include or correspond to additives 126, such as co-initiators, solvents, or both. Additionally, or alternatively, the method further includes applying, such as by DSA coating system 814, the polymer composition to a film, such as compound film 150.

Thus, method 1100 describes method of manufacturing a dual switchable adhesive. The dual switchable adhesive (e.g., a three or more phase dual switchable adhesive) enables medical devices to be repositionable and be more resistant to inadvertent contact as compared to conventional switchable adhesives, thereby increasing usability and reducing waste and patient discomfort. Accordingly, the dual switchable adhesives described herein may enable improved wound care and therapy, thereby advancing patient comfort and confidence in the treatment.

Figure 12:
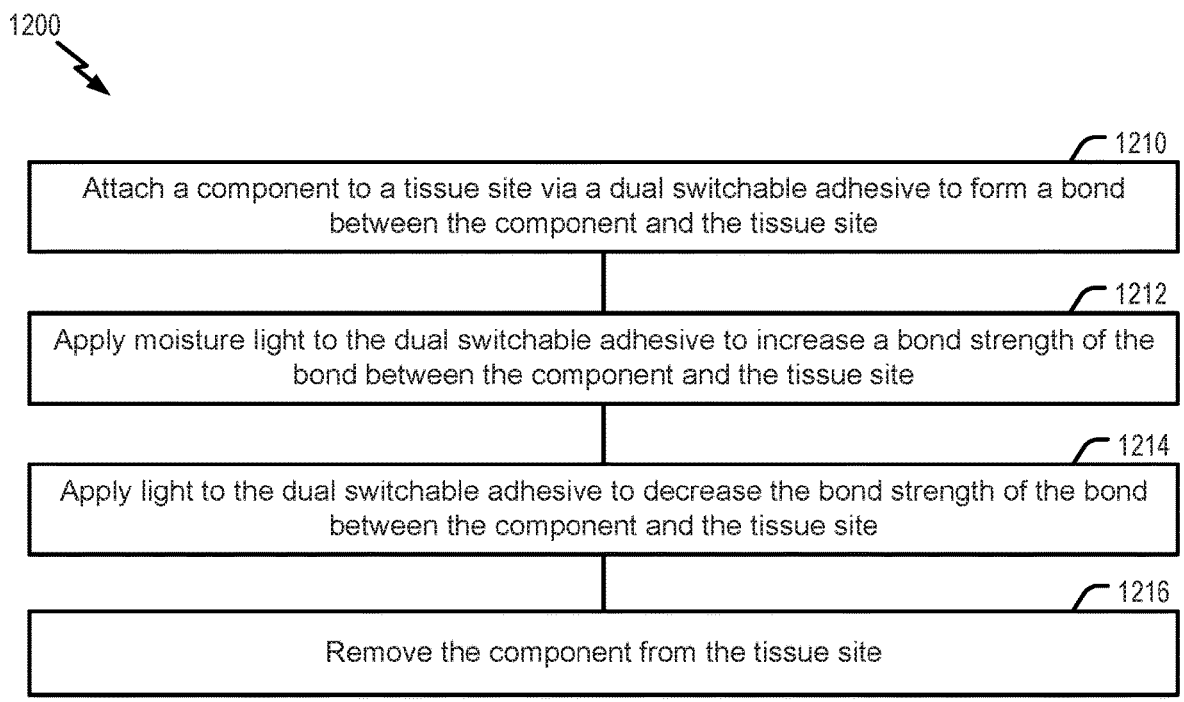
FIG. 12 is a flowchart illustrating an example of a method of using dual switchable adhesive.

FIG. 12 illustrates a method 1200 of using a dual switchable adhesive to attach a component to a tissue site. The method 1200 may be performed by a patient or care provider using one or more components of system 100 or system 700. Method 1200 includes attaching a component to a tissue site via a dual switchable adhesive to form a bond between the component and the tissue site, at 1210. For example, the component may include or correspond to a compound film 150 or a medical device, such as a component (e.g., drape 732) of system 700. The tissue site may include or correspond to tissue 522 or tissue site 720, and the dual switchable adhesive may include or correspond to DSA 110. To illustrate, a patient or care provider applies a component, such as drape 732 or compound film 152, to tissue 522 or tissue site 720 with DSA 110 or DSA 596 while the DSA is in a first phase 142.

Method 1200 also includes applying moisture to the dual switchable adhesive to increase a bond strength of the bond between the component and the tissue site, at 1212. For example, the moisture may include or correspond to moisture 134. To illustrate, a moisture source 114 and/or an applicator 516 provides moisture 134 and/or moisture 534 to the DSA 110, directly or indirectly, to change from the first phase 142 to the second phase 144, as illustrated in FIGS. 1A and 5B, to increase bond strength, as illustrated in FIG. 4A. As an example, the moisture 134 may be applied to the tissue site, to the DSA or underside/attachment side of the component, the non-DSA or topside of the component, or a combination thereof.

Method 1200 includes applying light to the dual switchable adhesive to decrease the bond strength of the bond between the component and the tissue site, at 1214. For example, the light may include or correspond to first light 132 or second light 136. To illustrate, a light device 112 or a light source 116 provides first light 132 to the DSA 110 to change from the second phase 144 to the third phase 146, as illustrated in FIG. 1A, to decrease bond strength, as illustrated in FIG. 4A.

Method 1200 further includes removing the component from the tissue site, at 1216. For example, a patient care provider or patient removes the compound film or medical device, such as a bandage, wound closure device, wound dressing, etc., from the tissue 522 or tissue site 720. In a particular implementation, the medical device is removed after a period of time or after an indication is produced by the DSA, such as a color change, as described with reference to FIG. 1.

Thus, method 1200 describes a method of using a dual switchable adhesive to attach a component to a tissue site. The dual switchable adhesive enables medical devices to be repositionable and be more resistant to inadvertent contact as compared to conventional light switchable adhesives, thereby increasing usability and reducing waste and patient discomfort. Accordingly, the dual switchable adhesives described herein may enable improved wound care and therapy, thereby advancing patient comfort and confidence in the treatment.

Figure 13:
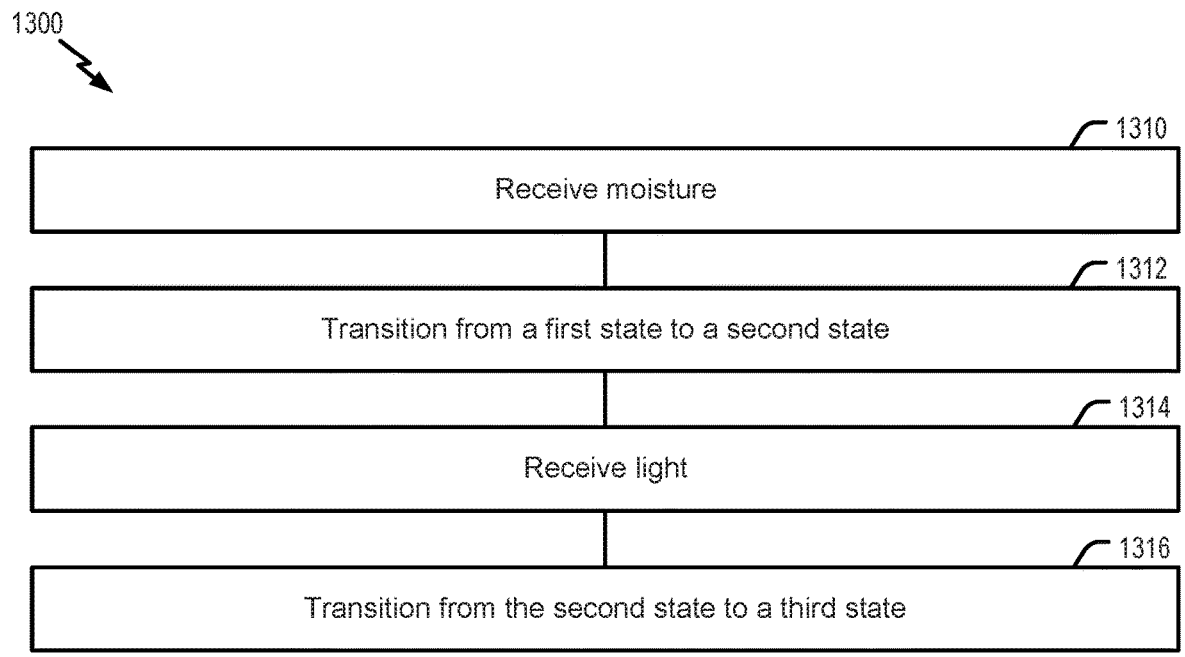
FIG. 13 is a flowchart illustrating an example of another method of using dual switchable adhesive.

FIG. 13 illustrates a method 1300 of using a dual switchable adhesive. The method 1300 may be performed at or by DSA 110, system 100 (e.g., DSA 110 thereof), system 700 (e.g., DSA 110 thereof), DSA 596, DSA 854, or DSA 910. Method 1300 includes receiving moisture, at 1310. For example, the moisture may include or correspond to moisture 134. To illustrate, a DSA receives moisture 134 from a moisture source 114, a moisture applicator 516, moisture applicator 719, wipe 924, or a combination thereof, as illustrated in FIG. 1A.

Method 1300 also includes transitioning from a first state to a second state, at 1312. For example, the first state may include or correspond to first phase 142, and the second state may include or correspond to second phase 144. To illustrate, the DSA transitions from the first phase 142 to the second phase 144 and increases in cross-linking and increases in peel strength as illustrated in FIGS. 2C and 3.

Method 1300 includes receiving light, at 1314. For example, the light may include or correspond to first light 132 or second light 136. To illustrate, the DSA receives first light 132 from a light device 112 or a light source 116, as illustrated in FIG. 1A.

Method 1300 further includes transitioning from the second state to a third state, at 1316. For example, the third state may include or correspond to the third state or phase 146, such as DSA 110 in FIG. 2D or DSA at t3 or t4 in FIG. 4A. To illustrate, the DSA transitions from the second phase 144 to the third phase 146 and increases in cross-linking and decreases in peel strength as illustrated in FIGS. 2D and 4A.

In some implementations, method 1300 further comprises transitioning from the third state to a fourth state. For example, the fourth state may include or correspond to the third state or phase or a fourth state for phase, such as DSA 110 in FIG. 2D or DSA at t3 or t4 in FIG. 3. To illustrate, the DSA increases in cross-linking and decreases in peel strength further as illustrated in FIG. 4A.

In some implementations, method 1300 further comprises providing a visual indication responsive to receiving moisture and/or light. Additionally, or alternatively, method 1300 further comprises providing a visual indication responsive to transitioning between two phases. For example, the first photo initiator may indicate a color change from blue/green to translucent, white to purple, blue to purple, etc., after the moisture has transitioned the DSA from the first phase to the second phase. As another example, the DSA may fluoresce blue when second light is being applied and may provide a yellow color shift (e.g., turn yellow in color) after the second light has transitioned the DSA from the second phase to the third phase.

Thus, method 1300 describes method of forming a compound film that includes dual switchable adhesive and that is suitable for use with dual switchable adhesive. The three or more phase dual switchable adhesive enables medical devices to be repositionable and be more resistant to inadvertent contact as compared to conventional switchable adhesives, thereby increasing usability and reducing waste and patient discomfort. Accordingly, the dual switchable adhesives described herein may enable improved wound care and therapy, thereby advancing patient comfort and confidence in the treatment.

Figure 14:
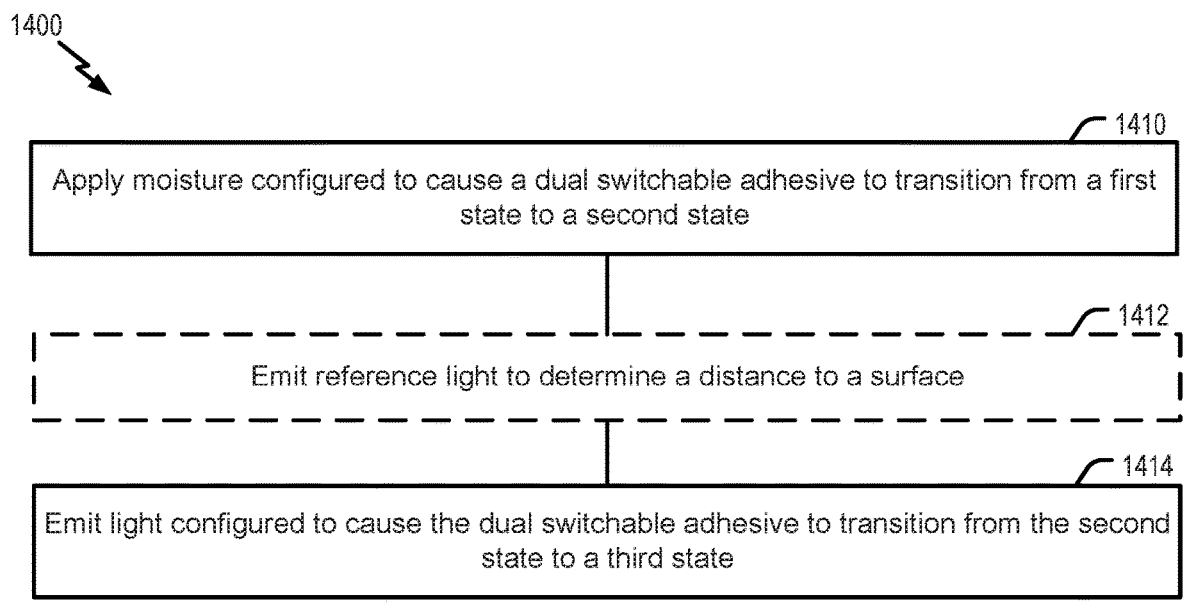
FIG. 14 is a flowchart illustrating an example of a method activating a dual switchable adhesive.

FIG. 14 illustrates a method 1400 of using moisture and a light device to activate a dual switchable adhesive. The method 1400 may be performed at or by system 100 (e.g., light device 112 and/or light source 116 thereof), light source 718, or light device 922.

Method 1400 includes applying moisture configured to cause a dual switchable adhesive to transition from a first state to a second state, at 1410. For example, the moisture may include or correspond to moisture 134 or moisture 534, and the dual switchable adhesive may include or correspond to DSA 110 or DSA 854. For example, the first state may include or correspond to the first phase 142, and the second state may include or correspond to the second phase 144. To illustrate, a moisture source 114 and/or a moisture applicator 516 provides moisture 134 and/or moisture 534 to DSA 110 to transition the DSA from the first phase 142 to the second phase 144, as illustrated in FIG. 1A.

Method 1400 optionally includes emitting reference light to determine a distance to a surface, at 1412. For example, the reference light may include or correspond to light emitted by the reference light source 936. To illustrate, the reference light source 936 emits reference light which is analyzed by controller 942. The controller 942 determines a distance between the light device 922 and the surface (e.g., a surface of a component including DSA) based on the reference light and outputs a visual, audio, or haptic indication via indicator 944. As an illustrative example, the distance is about 20 mm. In other implementations, the distance is between 5 mm to 100 cm.

Method 1400 further includes emitting light configured to cause the dual switchable adhesive to transition from the second state to a third state, at 1414. For example, the light may include or correspond to first light 132 or second light 136, and the third state may include or correspond to third phase 146. To illustrate, a light device 112 or a light source 116 provides light 132 to DSA 110 to transition the DSA 110 from the second phase 144 to the third phase 146, as illustrated in FIG. 1A. In some implementations, method 1400 further comprises coupling a cover film to the dual switchable adhesive. For example, the cover film 198, 498 may by removably coupled to the DSA 110.

Thus, method 1400 describes method of activating a three or more phase dual switchable adhesive. The three or more phase dual switchable adhesive enables medical devices to be repositionable and be more resistant to inadvertent contact as compared to conventional switchable adhesives, thereby increasing usability and reducing waste and patient discomfort. Accordingly, the dual switchable adhesives described herein may enable improved wound care and therapy, thereby advancing patient comfort and confidence in the treatment.

Figure 15:
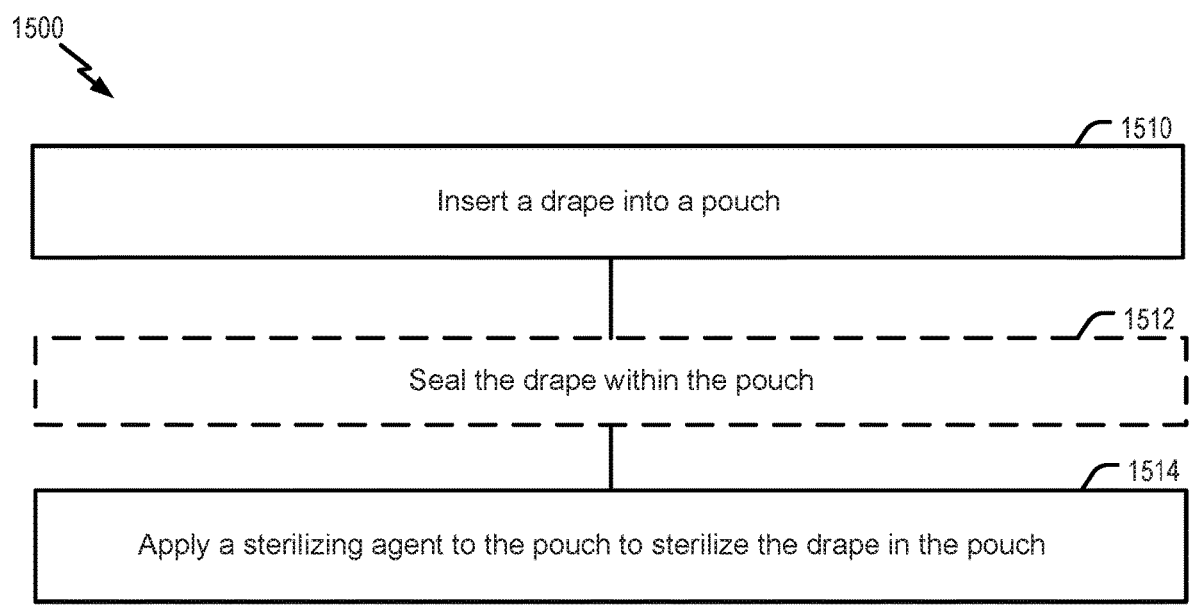
FIG. 15 is a flowchart illustrating an example of a method activating a dual switchable adhesive.

FIG. 15 illustrates a method 1500 of packaging a drape, such as a drape including a dual switchable adhesive. The method 1500 may be performed at or by packaging system 816 (e.g., packing equipment 842 and/or sterilization equipment 844 thereof).

Method 1500 includes inserting a drape into a pouch, at 1510. For example, the drape may include or correspond to compound film 152 or drape 732, and the pouch may include or correspond to pouch 914 or pouch 1002. To illustrate, packing equipment 842 places one or more drapes in the pouch, as illustrated in FIG. 8.

Method 1500 also include sealing the drape within the pouch, at 1512. For example, the drape may be sealed within the pouch by applying heat to the pouch to seal two ends or films of the pouch. To illustrate, packing equipment 842 applies heat to the pouch to seal the drape in the pouch, as illustrated in FIG. 8.

Method 1500 further includes applying a sterilizing agent to the pouch to sterilize the drape in the pouch, at 1514. For example, the sterilizing agent may include or correspond "dry processed" or gaseous ethylene oxide. To illustrate, sterilization equipment 844 applies gaseous ethylene oxide to the pouch, as illustrated in FIG. 1A. In some implementations, the pouch is in a sealed chamber which is evacuated prior to application (e.g., pumping in) of gaseous ethylene oxide. Alternatively, the sterilization equipment 844 evacuates the pouch of air via the one or more filters and pumps in gaseous ethylene oxide to the pouch via the one or more valves.

Thus, method 1500 describes method of packaging a drape, such as a drape including a dual switchable adhesive. The method of packaging enables drapes which include moisture cure adhesives to be packaged and sterilized without activation. Additionally, the method of packaging enables the drapes to be stored without activation.

It is noted that one or more operations described with reference to one of the methods of FIGS. 11-15 may be combined with one or more operations of another of FIGS. 11-15. For example, one or more operations of method 1100 may be combined with one or more operations of method 1200. Additionally, or alternatively, one or more operations described above with reference to FIGS. 1A, 1B, 2A-2D, 3A-3D, 4A, 4B, 5A-5D, 6, 7A, 7B, 8, 9, and 10 may be combined with one or more operations of FIGS. 11-15, or a combination of FIGS. 11-15.

The above specification and examples provide a complete description of the structure and use of illustrative examples. Although certain aspects have been described above with a certain degree of particularity, or with reference to one or more individual examples, those skilled in the art could make numerous alterations to aspects of the present disclosure without departing from the scope of the present disclosure. As such, the various illustrative examples of the methods and systems are not intended to be limited to the particular forms disclosed. Rather, they include all modifications and alternatives falling within the scope of the claims, and implementations other than the ones shown may include some or all of the features of the depicted examples. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one example or may relate to several examples. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A dual switchable adhesive comprising:
   one or more polymers;
   one or more photo initiators configured to cause the one or more polymers to cross-link responsive to receiving light; and
   one or more polymerization initiators configured to cause the one or more polymers to cross-link responsive to receiving moisture.

2. The dual switchable adhesive of claim 1, wherein:
   the switchable adhesive has at least three phases, each phase corresponding to a particular peel strength, and wherein the dual switchable adhesive is configured to transition between a first two phases of the three phases based on activation of the polymerization initiators and to transition between a second two phases of the three phases based on activation of the photo initiators; and
   the dual switchable adhesive has a second peel strength in the second phase that is greater than a first peel strength of the dual switchable adhesive in the first phase, and wherein a third peel strength of the dual switchable adhesive in the third phase is less than the second peel strength.

3. The dual switchable adhesive of claim 1, wherein;
   the switchable adhesive has at least three phases, each phase corresponding to a particular peel strength, and wherein the dual switchable adhesive is configured to transition between a first two phases of the three phases based on activation of the photo initiators and to transition between a second two phases of the three phases based on activation of the polymerization initiators; and
   the dual switchable adhesive has a second peel strength in the second phase that is greater than a first peel strength of the dual switchable adhesive in the first phase, and wherein a third peel strength of the dual switchable adhesive in the third phase is less than the second peel strength.

4. The dual switchable adhesive of claim 1, wherein the one or more polymers include an acrylate polymer, and wherein the dual switchable adhesive comprises a polymer composition that includes the one or more polymers, the polymerization initiators, and the photo initiators.

5. The dual switchable adhesive of claim 1, wherein the photo initiators have a peak absorbance between 200 nanometers (nm) to 400 nm or between 750 nm to 860 nm.

6. The dual switchable adhesive of claim 1, further comprising second photo initiators configured to cause the one or more polymers to cross-link responsive to receiving second light, the second light different from the light.

7. The dual switchable adhesive of claim 1, wherein:
the dual switchable adhesive has a peel strength of less than 7 Newtons per 25 millimeters (7 N/25 mm) on stainless steel at 180 degrees in a first phase;
the dual switchable adhesive has a peel strength of greater 8 Newtons per 25 millimeters (8 N/25 mm) on stainless steel at 180 degrees in a second phase; and
the dual switchable adhesive has a peel strength of less than 7 Newtons per 25 millimeters (7 N/25 mm) on stainless steel at 180 degrees in a third phase.

8. The dual switchable adhesive of claim 1, wherein the dual switchable adhesive has a dynamic viscosity of 320-500 millipascal-second (mPa*s) when in a first phase.

\* \* \* \* \*